(12) United States Patent
Helmick

(10) Patent No.: US 12,265,707 B2
(45) Date of Patent: Apr. 1, 2025

(54) SYSTEMS, METHODS, AND DEVICES FOR USING A RECLAIM UNIT BASED ON A REFERENCE UPDATE IN A STORAGE DEVICE

(71) Applicant: Samsung Electronics Co., Ltd., Suwon-si (KR)

(72) Inventor: Daniel Lee Helmick, Broomfield, CO (US)

(73) Assignee: SAMSUNG ELECTRONICS CO., LTD. (KR)

( * ) Notice: Subject to any disclaimer, the term of this patent is extended or adjusted under 35 U.S.C. 154(b) by 134 days.

(21) Appl. No.: 18/099,905

(22) Filed: Jan. 20, 2023

(65) Prior Publication Data
US 2024/0143171 A1  May 2, 2024

Related U.S. Application Data

(60) Provisional application No. 63/421,994, filed on Nov. 2, 2022, provisional application No. 63/419,699, filed
(Continued)

(51) Int. Cl.
G06F 3/06 (2006.01)

(52) U.S. Cl.
CPC ............ *G06F 3/0608* (2013.01); *G06F 3/064* (2013.01); *G06F 3/0652* (2013.01); *G06F 3/0679* (2013.01)

(58) Field of Classification Search
CPC ...... G06F 3/0608; G06F 3/064; G06F 3/0652; G06F 3/0679; G06F 2212/7205;
(Continued)

(56) References Cited

U.S. PATENT DOCUMENTS 8,543,758 B2   9/2013  Larson et al.
8,880,784 B2  11/2014  Chiueh et al.
(Continued)

FOREIGN PATENT DOCUMENTS

| EP | 1913480 B1 | 12/2010 |
|---|---|---|
| EP | 2940691 A1 | 11/2015 |
| WO | 2008045839 A1 | 4/2008 |

OTHER PUBLICATIONS

European Extended Search Report for Application No. 23177191.6, mailed Nov. 8, 2023.
(Continued)

*Primary Examiner* — Michael Krofcheck
(74) *Attorney, Agent, or Firm* — Renaissance IP Law Group LLP

(57) ABSTRACT

A storage device may include at least one storage medium, and a controller that may include at least one processor configured to perform an update operation associated with a reclaim unit handle that references at least one reclaim unit of the at least one storage medium, read, based on the update operation, data from a first reclaim unit of the at least one storage medium, and write, based on the update operation, the data to a second reclaim unit of the at least one storage medium. Based on the update operation, the second reclaim unit may be associated with the reclaim unit handle. The first reclaim unit may be associated with the reclaim unit handle. The reclaim unit handle may be a first reclaim unit handle, and the first reclaim unit may be associated with a second reclaim unit handle.

20 Claims, 22 Drawing Sheets

Related U.S. Application Data on Oct. 26, 2022, provisional application No. 63/358,861, filed on Jul. 6, 2022.

(58) Field of Classification Search
CPC .. G06F 12/0246; G06F 3/0658; G06F 3/0659; G06F 2212/7202
See application file for complete search history.

(56) References Cited

U.S. PATENT DOCUMENTS

| | | |
|---|---|---|
| 9,460,008 B1 | 10/2016 | Leshinsky et al. |
| 9,489,297 B2 | 11/2016 | Peterson et al. |
| 9,684,463 B1 | 6/2017 | Alshinnawi et al. |
| 9,760,309 B2 | 9/2017 | Toannou et al. |
| 10,102,144 B2 | 10/2018 | Sundararaman et al. |
| 10,168,917 B2 | 1/2019 | Dai et al. |
| 10,175,896 B2 | 1/2019 | Battaje et al. |
| 10,310,924 B2 | 6/2019 | Jei et al. |
| 10,877,898 B2 | 12/2020 | Li |
| 11,216,361 B2 | 1/2022 | Battaje et al. |
| 11,327,886 B2 | 5/2022 | Huang |
| 2008/0082596 A1* | 4/2008 | Gorobets ............ G06F 12/0253 |
| 2008/0091871 A1* | 4/2008 | Bennett ............... G06F 12/0246 |
| | | 711/E12.008 |
| 2014/0115238 A1* | 4/2014 | Xi ......................... G06F 12/12 |
| | | 711/159 |
| 2017/0300410 A1* | 10/2017 | Zhang ................ G06F 12/0246 |
| 2018/0196743 A1 | 7/2018 | McVay et al. |
| 2021/0096772 A1 | 4/2021 | Lee |
| 2022/0147392 A1 | 5/2022 | Choi et al. |

OTHER PUBLICATIONS

European Extended Search Report for Application No. 23177629.5, mailed Nov. 20, 2023.

European Extended Search Report for Application No. 23180630.8, mailed Nov. 20, 2023.

* cited by examiner

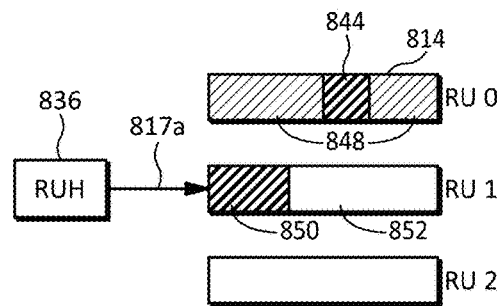
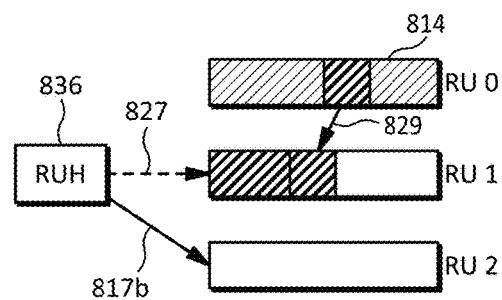
FIG. 8A  FIG. 8B
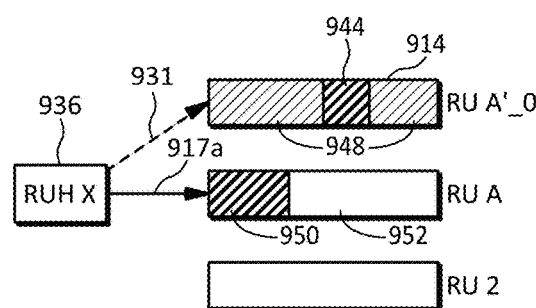
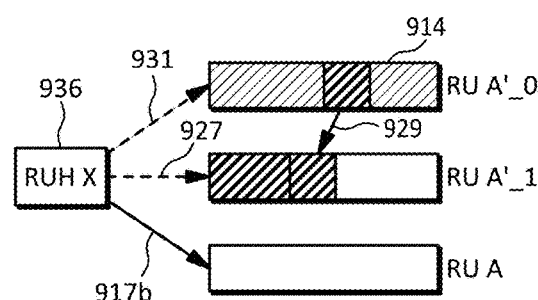
FIG. 9A  FIG. 9B
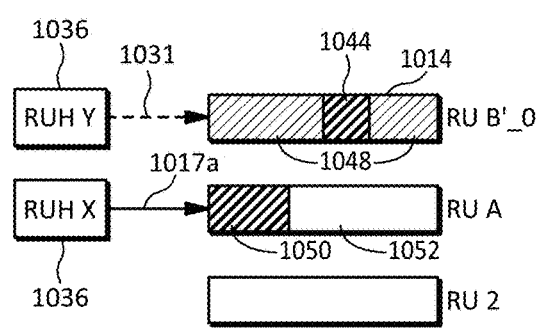
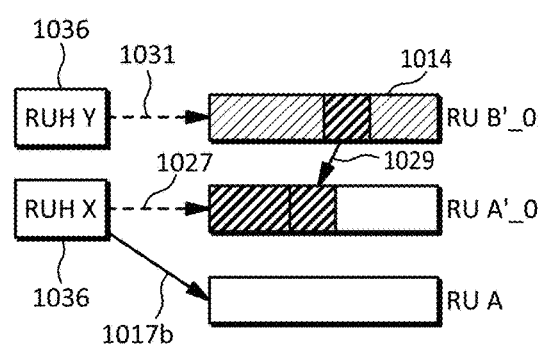
FIG. 10A  FIG. 10B

SYSTEMS, METHODS, AND DEVICES FOR USING A RECLAIM UNIT BASED ON A REFERENCE UPDATE IN A STORAGE DEVICE

REFERENCE TO RELATED APPLICATION

This application claims priority to, and the benefit of, U.S. Provisional Patent Application Ser. No. 63/358,861 filed Jul. 6, 2022, Ser. No. 63/419,699 filed Oct. 26, 2022, and Ser. No. 63/421,994 filed Nov. 2, 2022 all of which are incorporated by reference.

TECHNICAL FIELD

This disclosure relates generally to storage devices, and more specifically to systems, methods, and apparatus for data placement in storage devices.

BACKGROUND

A storage device such as a solid state drive (SSD) may store data in storage media that may be implemented with nonvolatile memory (NVM). In some nonvolatile memory, data may be updated by erasing the memory in which the data is stored and re-writing new data in the erased memory. Some nonvolatile memory may be written and/or read in units of pages but erased in units of blocks which may include multiple pages. Thus, to update data stored in a page of nonvolatile memory, valid data stored in other pages in the same block may be copied to a different block to prevent loss of the valid data when the block is erased.

The above information disclosed in this Background section is only for enhancement of understanding of the background of the inventive principles and therefore it may contain information that does not constitute prior art.

SUMMARY

A storage device may include at least one storage medium, and a controller that may include at least one processor configured to perform an update operation associated with a reclaim unit handle that references at least one reclaim unit of the at least one storage medium, read, based on the update operation, data from a first reclaim unit of the at least one storage medium, and write, based on the update operation, the data to a second reclaim unit of the at least one storage medium. Based on the update operation, the second reclaim unit may be associated with the reclaim unit handle. The first reclaim unit may be associated with the reclaim unit handle. The reclaim unit handle may be a first reclaim unit handle, and the first reclaim unit may be associated with a second reclaim unit handle. The at least one processor may be configured to perform a reclaim operation on the first reclaim unit based on the update operation. The at least one processor may be configured to fill the second reclaim unit based, at least in part, on the update operation. The data may be first data, and the at least one processor may be configured to read second data from a third reclaim unit of the at least one storage medium, and write the second data to the second reclaim unit. The third reclaim unit may be associated with the reclaim unit handle. Based on the update operation, the first reclaim unit may be associated with the reclaim unit handle. The data may be first data, the first data may be written to a first portion of the second reclaim unit, and at least a second portion of the second reclaim unit includes second data associated with the reclaim unit handle. The data may be first data, the first data may be written to a first portion of the second reclaim unit, the reclaim unit handle may be a first reclaim unit handle, and at least a second portion of the second reclaim unit includes second data associated with a second reclaim unit handle. The at least one processor may be configured to perform a reclaim operation on the first reclaim unit based on the update operation. The update operation may include modifying the reclaim unit handle.

A method may include performing an update operation associated with a reclaim unit handle that references at least one reclaim unit of at least one storage medium, reading, based on the update operation, data from a first reclaim unit of the at least one storage medium, and writing, based on the update operation, the data to a second reclaim unit of the at least one storage medium. The second reclaim unit may be associated with the reclaim unit handle. The first reclaim unit may be associated with the reclaim unit handle. The reclaim unit handle may be a first reclaim unit handle, and the first reclaim unit may be associated with a second reclaim unit handle. Based on the update operation, the first reclaim unit may be associated with the reclaim unit handle. The update operation may include modifying the reclaim unit handle.

A storage device may include at least one storage medium, and a controller that may include at least one processor configured to perform an update operation associated with a reclaim unit of the at least one storage medium, wherein a first portion of the reclaim unit includes data, and the update operation may include referencing, by a reclaim unit handle, a second portion of the reclaim unit and at least a portion of an overprovisioning space associated with the reclaim unit.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 8A illustrates an embodiment of a flexible data placement scheme with data transfer to a reclaim unit in a storage device in a first state in accordance with example embodiments of the disclosure.

FIG. 8B illustrates the embodiment illustrated in FIG. 8A in a second state in accordance with example embodiments of the disclosure.

FIG. 9A illustrates an embodiment of a flexible data placement scheme with data transfer to a reclaim unit using persistent isolation in a storage device in a first state in accordance with example embodiments of the disclosure.

FIG. 9B illustrates the embodiment illustrated in FIG. 9A in a second state in accordance with example embodiments of the disclosure.

FIG. 10A illustrates an embodiment of a flexible data placement scheme with data transfer to a reclaim unit using initial isolation in a storage device in a first state in accordance with example embodiments of the disclosure.

FIG. 10B illustrates the embodiment illustrated in FIG. 10A in a second state in accordance with example embodiments of the disclosure.

DETAILED DESCRIPTION

Figure 1A:
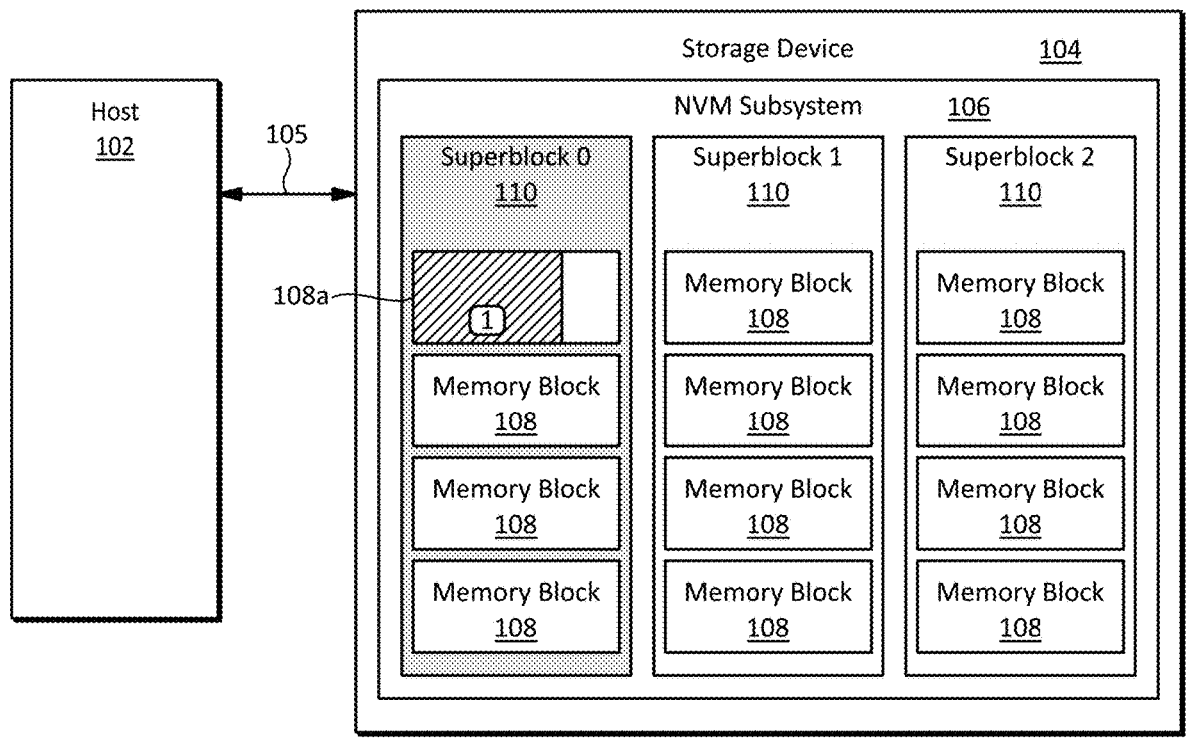
FIG. 1A illustrates an embodiment of a data placement scheme for a storage device in a first data placement state in accordance with example embodiments of the disclosure.

A storage device may implement a flexible data placement (FDP) scheme that may enable a host to arrange data into one or more physical reclaim units (RUs) in the storage device. A reclaim unit may be implemented with a portion of physical storage media (e.g., one or more erase blocks) that may be erased as a unit. This may reduce write amplification, for example, by enabling the host to place data that is likely to be deallocated at the same time in the same reclaim unit.

A flexible data placement scheme may use a reclaim unit handle to enable a host to specify one or more reclaim units in the storage device into which the storage device may write data. For example, a host may send a write command to a storage device. The write command may specify data to be written to the storage device. The write command may also include, or provide a technique to indicate, a reclaim unit handle to specify one or more reclaim units into which the storage device may write the data. At the storage device, the reclaim unit handle may initially reference a first reclaim unit into which the storage device may write the data specified by the host.

The host may send one or more additional write commands specifying additional data to be written to the storage device using the same reclaim unit handle. The storage device may begin writing the additional data into the first reclaim unit referenced by the reclaim unit handle. As the first reclaim unit becomes full, the storage device may modify the reclaim unit handle to reference a second reclaim unit into which the storage device may continue writing the data. Although no longer referenced by the reclaim unit handle (a state that may be referred to as dereferenced or previously referenced), the first reclaim unit may remain associated with the reclaim unit handle to indicate that it was written using the reclaim unit handle.

A flexible data placement scheme may implement an update operation that may modify a reclaim unit handle to reference a different reclaim unit, for example, an empty reclaim unit. An update operation may be requested, for example, by a host. However, if a rust reclaim unit referenced by a reclaim unit handle is not full when an update operation modifies the reclaim unit handle to reference a second reclaim unit, the first reclaim unit may remain only partially full. Depending on the physical storage media used to implement the first reclaim unit, leaving a reclaim unit partially full may reduce the reliability, durability, performance, and/or the like, of the reclaim unit and/or the storage media with which it is implemented. Therefore, a flexible data placement scheme may fill some or all of an unfilled portion of a previously referenced reclaim unit with fill data such as zeros, random data, and/or controller metadata. The use of fill data, however, may result in wasted or underutilized storage space.

A flexible data placement scheme in accordance with example embodiments of the disclosure may transfer data between reclaim units based on an update operation. For example, when a reclaim unit handle references a first reclaim unit that is partially full, and an update operation modifies the reclaim unit handle to reference a second (e.g., empty) reclaim unit, data may be read from one or more additional reclaim units (e.g., a third reclaim unit, and/or a fourth reclaim unit) and written to an empty portion of the first reclaim unit. The data read from the one or more additional reclaim units may include, for example, valid user data that may otherwise be moved as part of one or more garbage collection operations that may erase or otherwise reclaim the one or more additional reclaim units. Depending on the implementation details, this may reduce write amplification, for example, by using program cycles that would otherwise have been used to store fill data in the first reclaim unit to store valid data from the one or more additional reclaim units.

As another example of transferring data between reclaim units based on an update operation, when a reclaim unit handle references a first reclaim unit that is partially full, and an update operation modifies the reclaim unit handle to reference a second (e.g., empty) reclaim unit, data may be moved or copied from one or more filled portions of the first reclaim unit to one or more additional reclaim units. Depending on the implementation details, this may enable the first reclaim unit to be erased, returned to a pool of available (e.g., empty, erased, and/or the like) memory for later reuse, and/or otherwise reclaimed.

In some embodiments, data that may remain in a reclaim unit and/or be transferred between reclaim units based on an update operation may be referenced by, and/or associated with, the same or different reclaim unit handles, depending, for example, on an isolation scheme. For example, some embodiments may implement a persistent isolation scheme in which data that was written to a first reclaim unit using a first reclaim unit handle may only be combined (e.g., in a third reclaim unit) with data that was written to one or more additional reclaim units using the first reclaim unit handle (e.g., during a garbage collection operation). Thus, in a persistent isolation scheme, data that may remain in a reclaim unit and/or be transferred between reclaim units based on an update operation may only be referenced by, and/or associated with the same reclaim unit handle. In some embodiments, a reclaim unit may be referred to as associated with a reclaim unit handle if at least a portion of the reclaim unit was written using the reclaim unit handle.

As another example, some embodiments may implement an initial isolation scheme in which data that was written to a first reclaim unit using a first reclaim unit handle may be combined (e.g., in a third reclaim unit) with data that was written to one or more other reclaim units using one or more other reclaim unit handles (e.g., during a garbage collection operation). Thus, in an initial isolation scheme, data that may remain in a reclaim unit and/or be transferred between reclaim units based on an update operation may be referenced by, and/or associated with, more than one reclaim unit handle.

Additionally, or alternatively, a flexible data placement scheme in accordance with example embodiments of the disclosure may store data in one or more overprovisioning spaces associated with one or more reclaim units. For example, if a reclaim unit handle references a reclaim unit having an associated overprovisioning space, and the referenced reclaim unit is only partially full when an update operation is requested, rather than modifying the reclaim unit handle to reference a different (e.g., empty) reclaim unit, the reclaim unit handle may be left unmodified, and at least a portion of the overprovisioning space may be used to store user data written to the reclaim unit in response to one or more write commands that may specify the reclaim unit handle. In some embodiments, this may be characterized as modifying, based on an update request, the reclaim unit rather than, or in addition to, the reclaim unit handle.

As another example of using overprovisioning space associated with a reclaim unit, if a reclaim unit is full (or nearly full) when an update operation is performed, data from another reclaim unit (e.g., valid user data in a previously referenced reclaim unit) may be transferred into at least a portion of an overprovisioning space associated with the reclaim unit (and/or an empty portion of the reclaim unit).

This disclosure encompasses numerous inventive principles relating to flexible data placement. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some embodiments may be described in the context of specific implementation details such as storage devices implemented with solid state drives (SSDs) using not-AND (NAND) flash memory, a Nonvolatile Memory Express (NVMe) protocol, and/or the like. The inventive principles, however, are not limited to these or any other implementation details. For example, some embodiments may implement storage media with flash memory, magnetic media, storage class memory (SCM), and/or the like, or any combination thereof.

In some embodiments in which storage media may be implemented at least partially with flash memory, a reclaim unit may refer to one or more erase blocks, NVM devices (e.g., NVM dies) and/or the like, or any combination thereof, and a reclaim group may refer to one or more reclaim units, one or more NVM device partitions (e.g., planes), one or more NVM devices (e.g., NVM dies), one or more storage devices (e.g., storage drives), and/or the like, or any combination thereof.

In some embodiments in which storage media may be implemented at least partially with magnetic media (e.g., shingled magnetic recording (SMR) media), a reclaim unit may refer to one or more shingle sections, zones, sectors, tracks, and/or the like, or any combination thereof, and a reclaim group may refer to one or more disks (e.g., drives), platters, tracks, zones, sectors, shingle sections, and/or the like, or any combination thereof.

In some embodiments in which storage media may be implemented at least partially with storage class memory (e.g., magnetoresistive random-access memory (MRAM), resistive random-access memory (ReRAM), phase change memory (PCM), cross-gridded nonvolatile memory, memory with bulk resistance change, and/or the like), a reclaim unit may refer to one or more banks, programming groups, and/or the like, or any combination thereof, and a reclaim group may refer to one or more die, banks, programming groups, and/or the like, or any combination thereof.

Figure 1B:
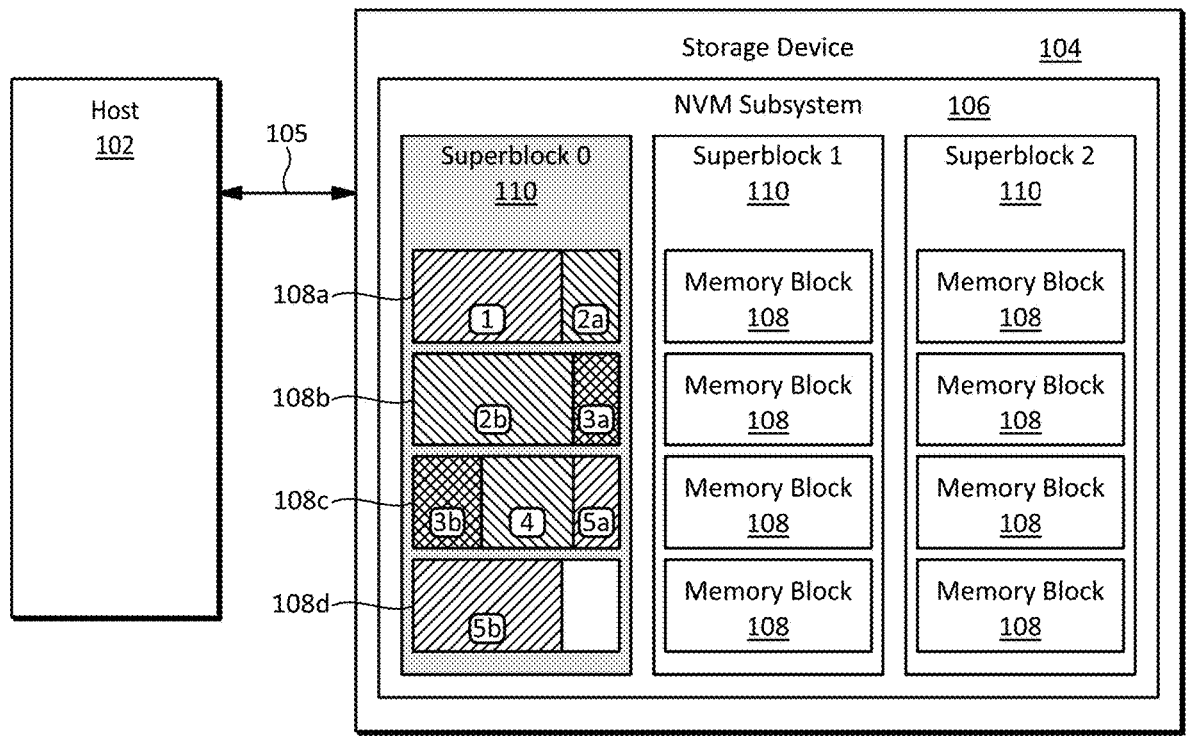
FIG. 1B illustrates the embodiment of the data placement scheme illustrated in FIG. 1A in a second data placement state in accordance with example embodiments of the disclosure.
Figure 1C:
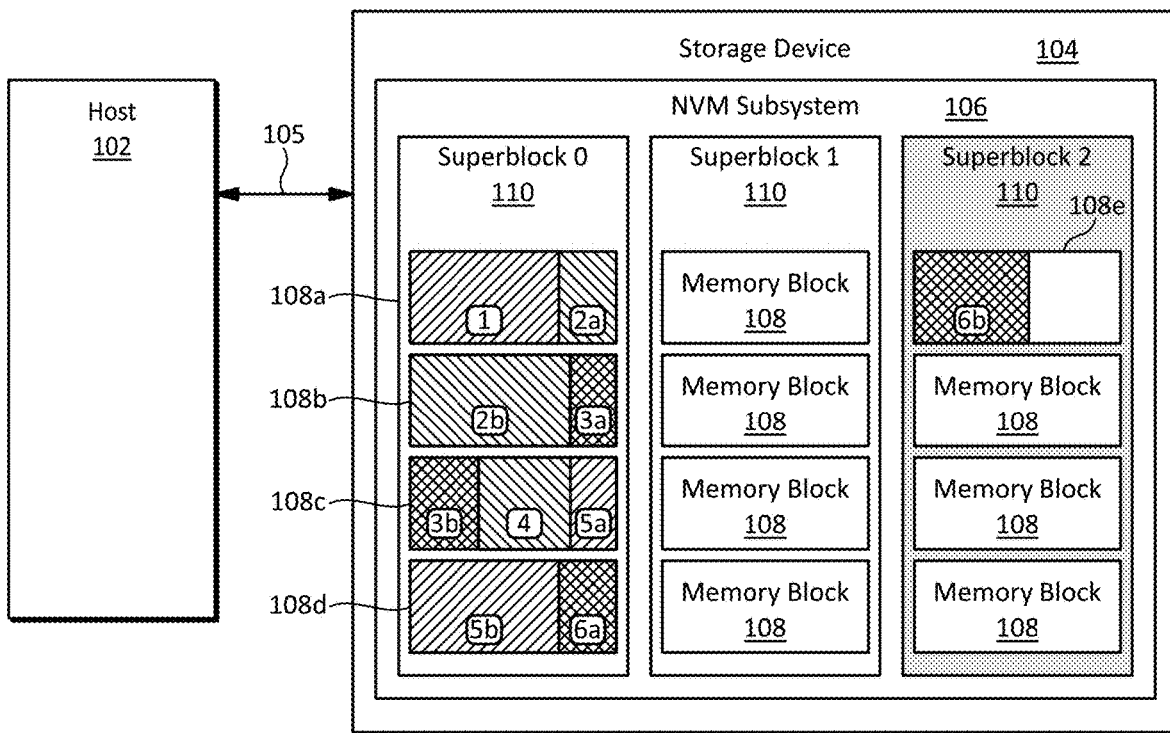
FIG. 1C illustrates the embodiment of the data placement scheme illustrated in FIG. 1A in a third data placement state in accordance with example embodiments of the disclosure.
Figure 1D:
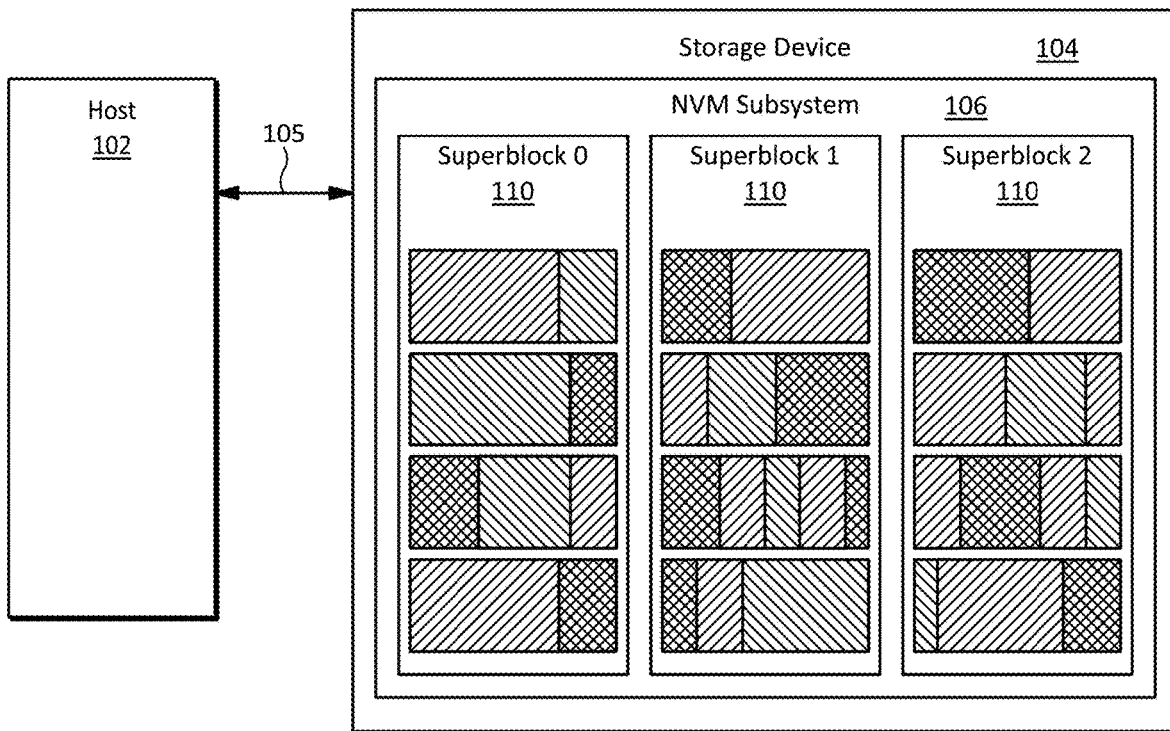
FIG. 1D illustrates the embodiment of the data placement scheme illustrated in FIG. 1A in a fourth data placement state in accordance with example embodiments of the disclosure.
Figure 1E:
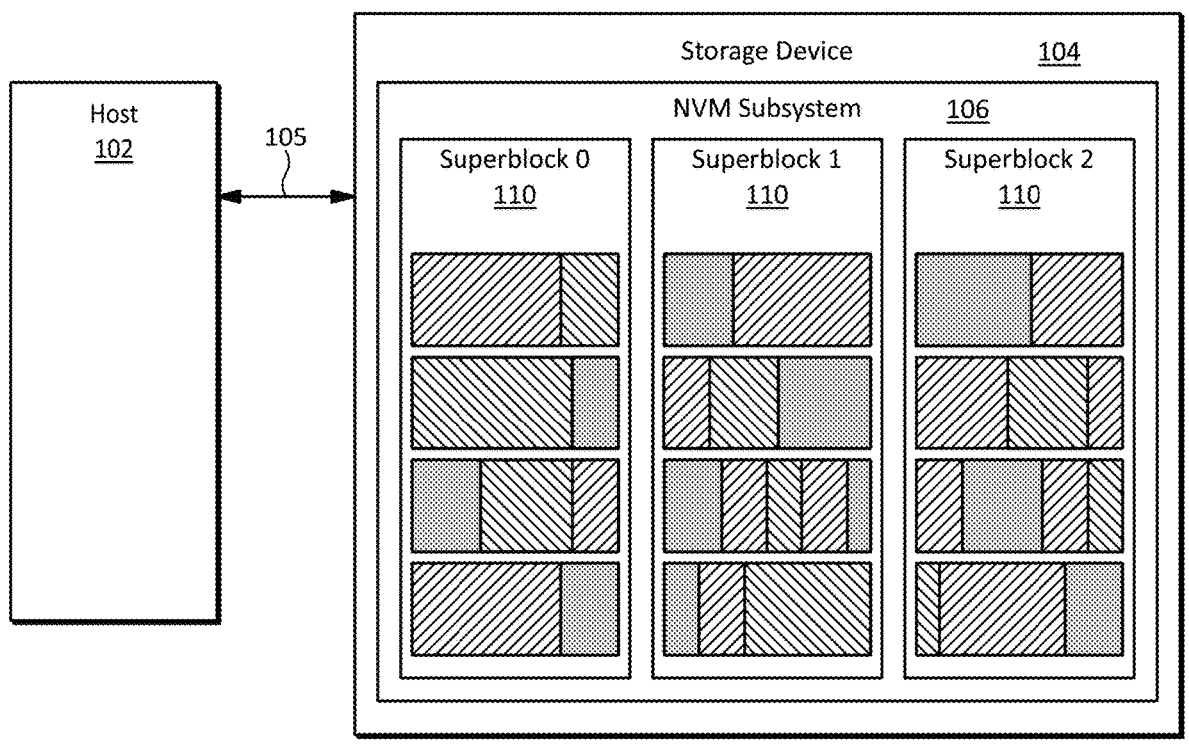
FIG. 1E illustrates the embodiment of the data placement scheme illustrated in FIG. 1A in a fifth data placement state in accordance with example embodiments of the disclosure.

FIG. 1A illustrates an embodiment of a data placement scheme for a storage device in a first data placement state in accordance with example embodiments of the disclosure. FIG. 1B illustrates the embodiment of the data placement scheme illustrated in FIG. 1A in a second data placement state in accordance with example embodiments of the disclosure. FIG. 1C illustrates the embodiment of the data placement scheme illustrated in FIG. 1A in a third data placement state in accordance with example embodiments of the disclosure. FIG. 1D illustrates the embodiment of the data placement scheme illustrated in FIG. 1A in a fourth data placement state in accordance with example embodiments of the disclosure. FIG. 1E illustrates the embodiment of the data placement scheme illustrated in FIG. 1A in a fifth data placement state in accordance with example embodiments of the disclosure.

FIG. 1A, FIG. 1B, FIG. 1C, FIG. 1D, and/or FIG. 1E may be referred to collectively and/or individually as FIG. 1.

The embodiment illustrated in FIG. 1 may include a host 102 and a storage device 104 communicating using a communication connection 105. The storage device 104 may include storage media in an NVM subsystem 106 having memory blocks 108 arranged in superblocks 110. The memory blocks 108 may be implemented with nonvolatile memory that may be erased in units of the blocks illustrated in FIG. 1 and thus may also be referred to as erase blocks. The memory blocks 108 may be programmed (e.g., written) and/or read in units of pages and/or word lines which may be smaller than memory blocks. The memory blocks 108 may be erased before pages and/or word lines of data may be written into them. The memory blocks 108 may be arranged in superblocks 110, for example, to simplify management of the blocks 108. Thus, the nonvolatile memory illustrated in FIG. 1 may be erased in units of superblocks 110.

The storage device 104 may receive input and/or output (I/O or IO) requests (which may also be referred to as commands) from the host 102 to enable the host to access the NVM subsystem (e.g., write data into the storage media and/or read data from the storage media). The host may divide the data into namespaces indicated by the different types of shading illustrated in FIG. 1. Specifically, data belonging to a first namespace (which may be referred to by namespace identifier 1 (NSID 1)) may be indicated by shading with diagonal lines from top right to bottom left, data belonging to a second namespace (which may be referred to be NSID 2) may be indicated by shading with diagonal lines from top left to bottom right, and data belonging to a third namespace (which may be referred to by namespace NSID 3) may be indicated by diagonal cross-shading. In some embodiments, in addition to namespaces, and/or as an alternative to namespaces, the host 102 may divide and/or arrange the data into groups based on logical block addresses (LBAs), one or more applications that may use the data, host write traffic threads, and/or the like, for separating and/or managing data based on reclaim unit handles, reclaim units, erase units, and/or the like.

Memory blocks 108 may initially be in an erased state as shown by the absence of shading. Prior to receiving write commands, the NVM subsystem 106 may select an erased superblock (e.g., Superblock 0 indicated by solid shading) into which write data may be placed. The erased superblock may be selected randomly or using a round robin technique. Thus, memory block 108a may initially be empty prior to the NVM subsystem 106 receiving write commands.

Referring to FIG. 1A, the storage device 104 may receive a first write command with write data belonging to NSID 1. The NVM subsystem 106 may place the data belonging to NSID 1 (indicated by the number 1 in a rounded rectangle) in a first memory block 108a of Superblock 0 as illustrated in FIG. 1A. (The number 1 may indicate a sequence in which the data may be placed rather than the NSID.)

Referring to FIG. 1B, the storage device 104 may continue receiving additional write commands from the host 102 with write data belonging to various namespaces. The NVM subsystem 106 may fill the memory blocks 108a-108d in Superblock 0 by placing the write data in the sequence indicated by the numbers in the rounded rectangles. In some cases, the quantity of write data may be larger than the space remaining in a memory block. Thus, a first portion of the write data may be placed so as to fill the remaining space in a first memory block, and a second portion may be placed in an empty memory block. For example, as shown in FIG. 1B, based on receiving a second write command, a first portion 2a of data belonging to NSID 2 may be used to fill the remaining space in memory block 108a, and a second portion 2b of data belonging to NSID 2 may be placed in memory block 108b. The NVM subsystem 106 may continue placing write data into Superblock 0 until Superblock 0 is full or nearly full as shown in FIG. 1B.

Referring to FIG. 1C, the storage device 104 may receive a sixth write command with data belonging to NSID 3 that is too large to fit in the remaining space in memory block 108d in Superblock 0. Thus, the NVM subsystem 106 may select a new empty superblock (e.g., Superblock 2 indicated by solid shading) into which write data may be placed. The NVM subsystem 106 may use a first portion 6a of data belonging to NSID 3 to fill the remaining space in memory block 108d, and a second portion 6b of data belonging to NSID 3 may be placed in memory block 108e in Superblock 2. The NVM subsystem 106 may continue placing write data into Superblock 2, and then Superblock 1, with data belonging to different namespaces mixed within one or more superblocks as shown in FIG. 1D. Data belonging to different namespaces may be mixed within blocks 108 and/or superblocks 110, for example, because the host 102 may be unaware of, and/or have no control over, the manner in which the NVM subsystem 106 places data within the blocks 108 and/or superblocks 110.

The host 102 may divide data into namespaces, for example, to provide isolation between sources of data such as applications, processes, logical block address (LBA) range, and/or the like. Thus, the host 102 may deallocate some or all data belonging to a namespace at the same time, for example, when an application terminates.

FIG. 1E illustrates an example in which the host 102 has deallocated data belonging to the namespace indicated as NSID 3 which is shown with solid shading after deallocation. Reusing the deallocated storage space may involve erasing the deallocated storage space. However, because superblocks 110 may be erased as units, the NVM subsystem 106 may move the remaining valid data in a superblock to a different superblock to prevent loss of the valid data when the superblock is erased. Depending on the implementation details, this may result in write amplification that may reduce the useful life of the storage media.

Figure 2A:
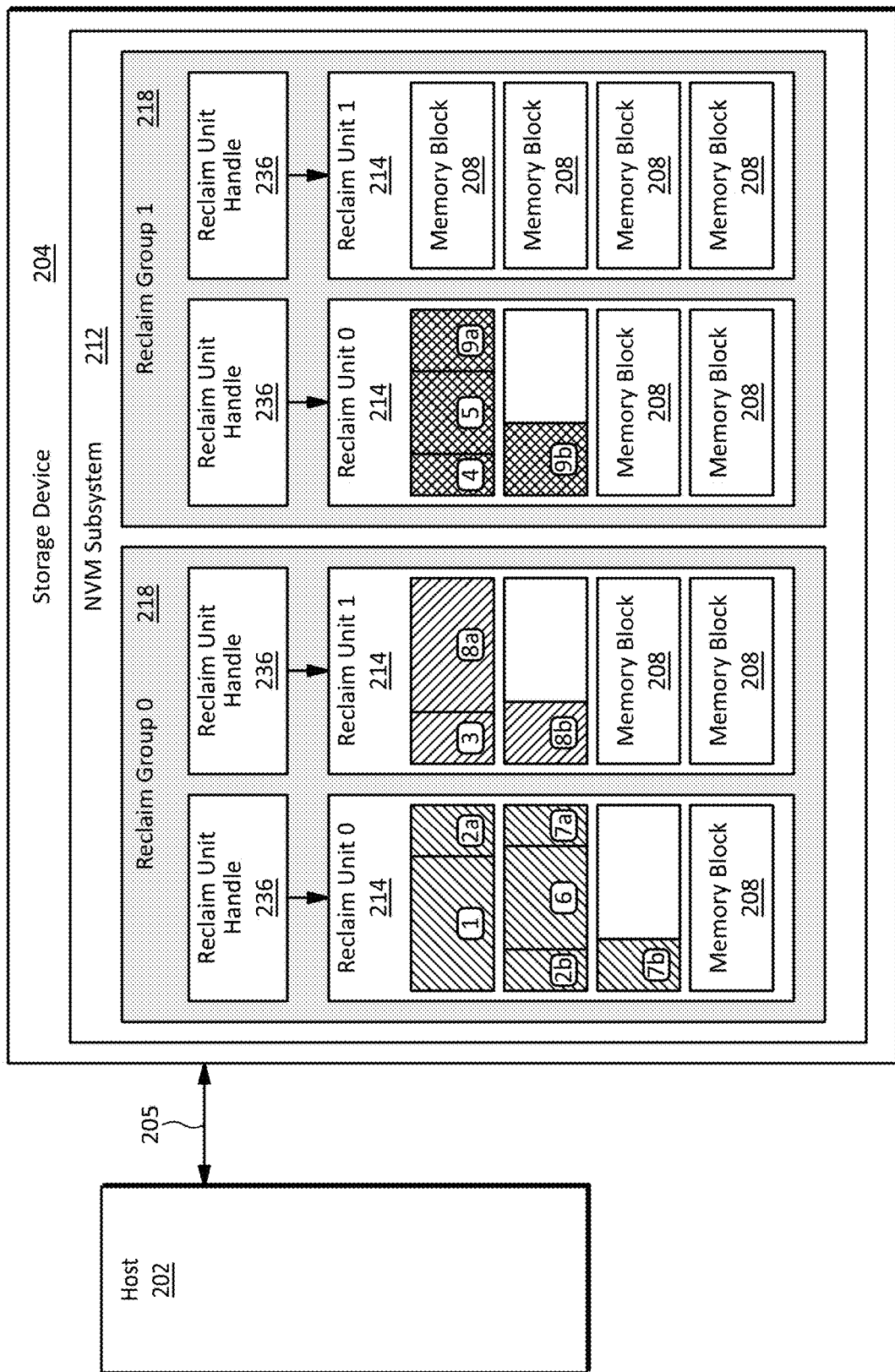
FIG. 2A illustrates an embodiment of a flexible data placement scheme for a storage device in a first data placement state in accordance with example embodiments of the disclosure.
Figure 2B:
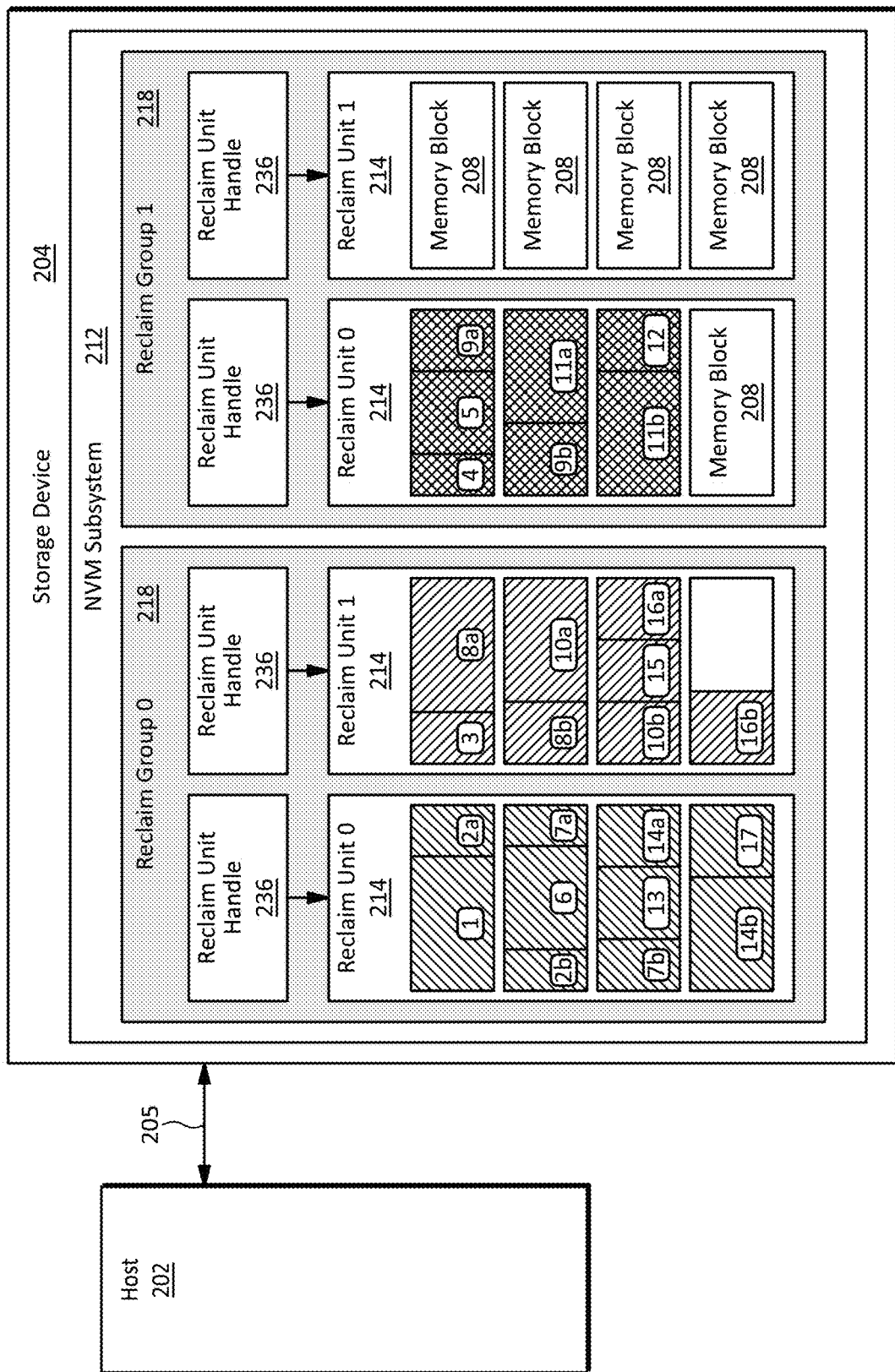
FIG. 2B illustrates the embodiment of the data placement scheme illustrated in FIG. 2A in a second data placement state in accordance with example embodiments of the disclosure.
Figure 2C:
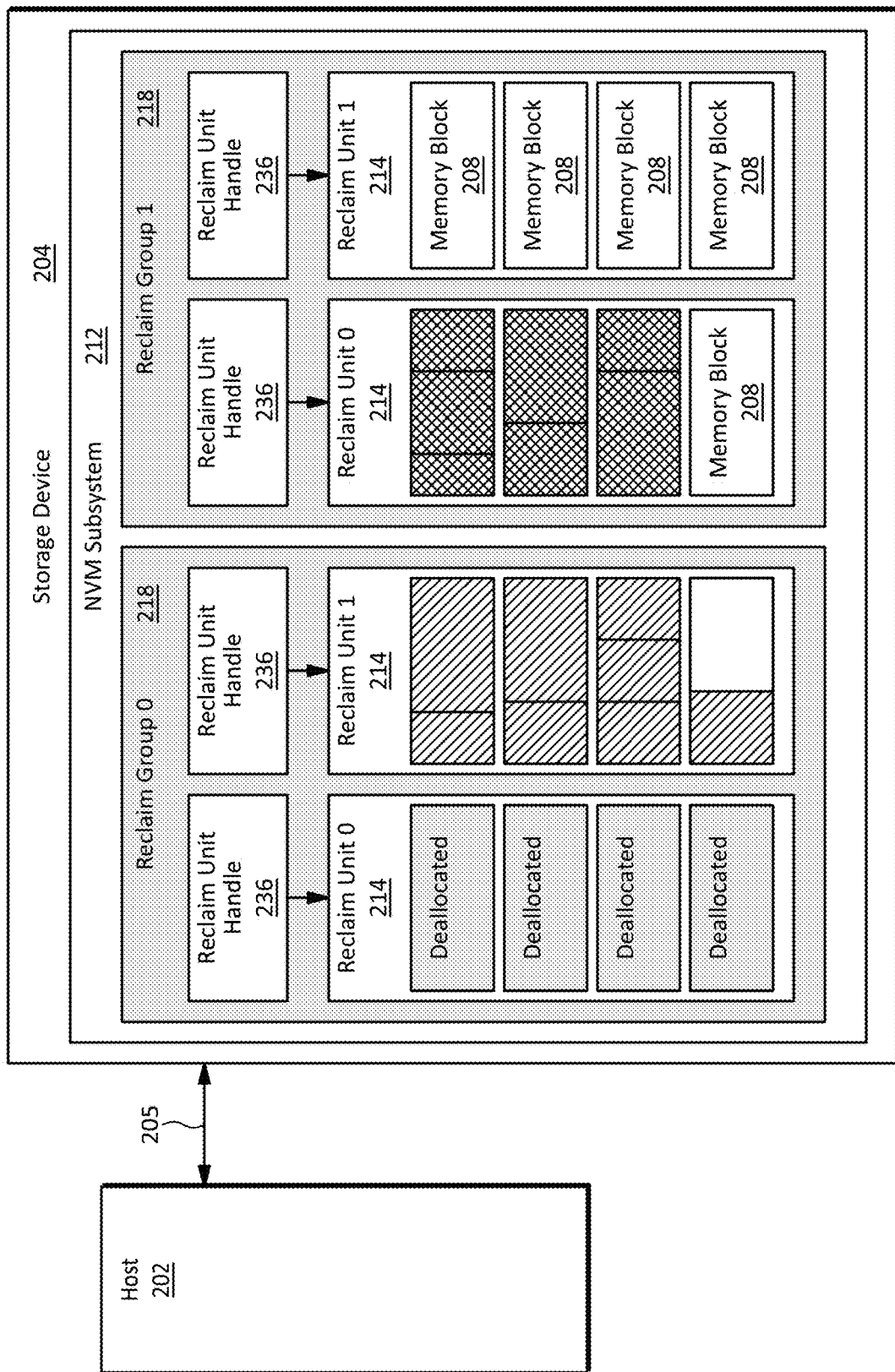
FIG. 2C illustrates the embodiment of the data placement scheme illustrated in FIG. 2A in a third data placement state in accordance with example embodiments of the disclosure.
Figure 2D:
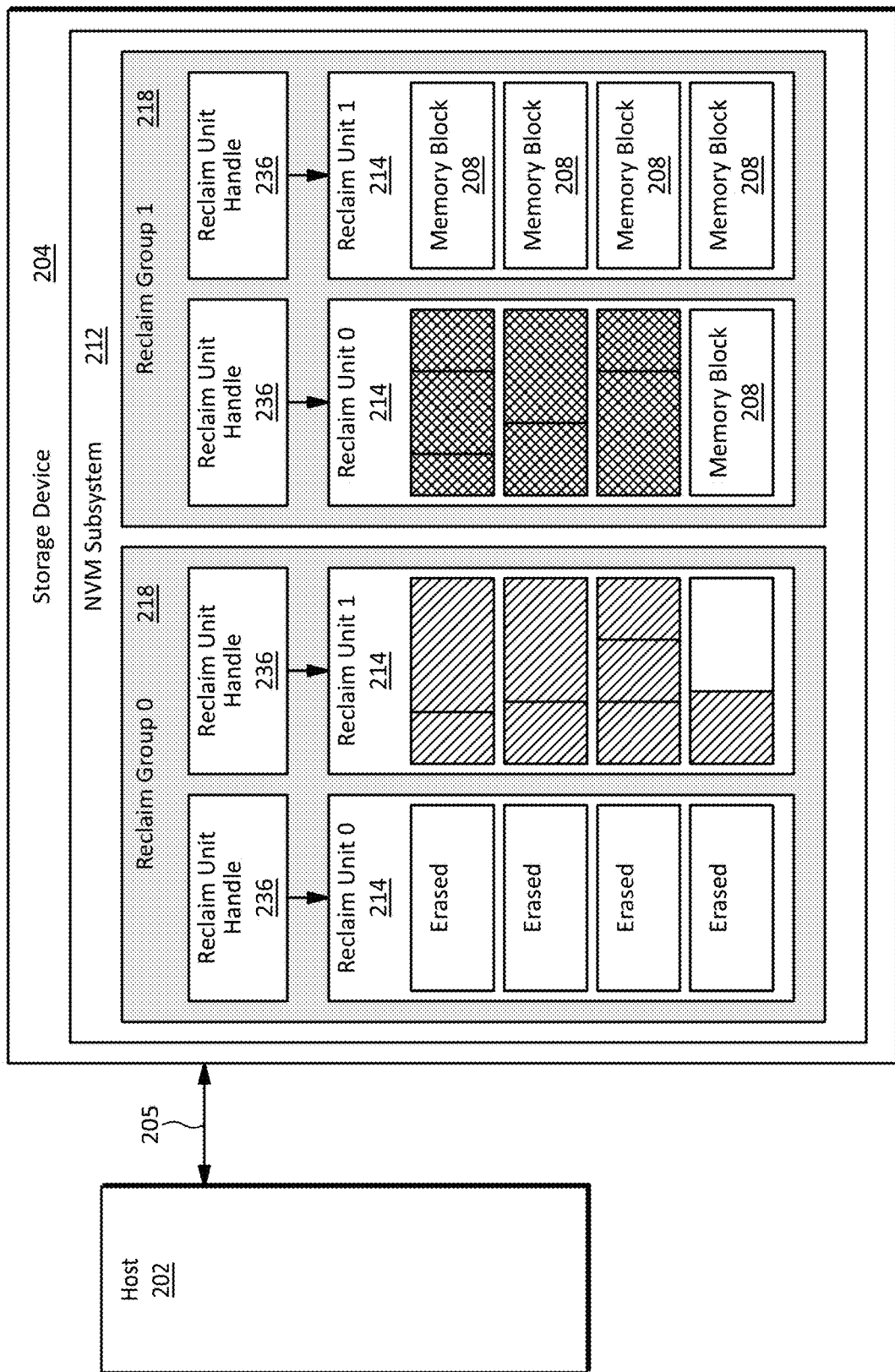
FIG. 2D illustrates the embodiment of the data placement scheme illustrated in FIG. 2A in a fourth data placement state in accordance with example embodiments of the disclosure.

FIG. 2A illustrates an embodiment of a flexible data placement scheme for a storage device in a first data placement state in accordance with example embodiments of the disclosure. FIG. 2B illustrates the embodiment of the data placement scheme illustrated in FIG. 2A in a second data placement state in accordance with example embodiments of the disclosure. FIG. 2C illustrates the embodiment of the data placement scheme illustrated in FIG. 2A in a third data placement state in accordance with example embodiments of the disclosure. FIG. 2D illustrates the embodiment of the data placement scheme illustrated in FIG. 2A in a fourth data placement state in accordance with example embodiments of the disclosure.

FIG. 2A, FIG. 2B, FIG. 2C, and/or FIG. 2D may be referred to collectively and/or individually as FIG. 2.

The embodiment illustrated in FIG. 2 may include some components such as a host 202, a storage device 204, a communication connection 205, and/or memory blocks 208 which, in some aspects, may operate in a manner similar to the corresponding components in the embodiment illustrated in FIG. 1. However, in the embodiment illustrated in FIG. 2, memory blocks 208 in the NVM subsystem 212 may be arranged in one or more reclaim units 214 that may be erased as a unit and may include one or more memory blocks 208. A reclaim unit 214 may be implemented, for example with one or more erase blocks, superblock, and/or the like. Moreover, the reclaim units 214 may be identified by corresponding reclaim unit handles 236 that may enable the host 202 to specify (e.g., in a field of a write command) a specific reclaim unit 214 to use for storing the write data associated with the write command. In some embodiments, some or all of the reclaim units 214 may be arranged in one or more reclaim groups 218 which the host may also specify, for example, using one or more corresponding reclaim group identifiers (e.g., in a field of a write command). In some embodiments, a reclaim unit handle 236 may identify more than one reclaim unit 216. For example, a reclaim unit handle 236 may identify (e.g., map to) one or more reclaim units 216 in one or more (e.g., each) reclaim group 218 (e.g., in a manner similar to that illustrated in FIG. 4.)

Thus, by specifying specific reclaim units 214 and/or reclaim groups 218 to use for storing data associated with write commands, the host 202 may cause the NVM subsystem 212 to only store data belonging to one or more specific namespaces in one or more reclaim units 214 and/or reclaim groups 218.

For example, referring to FIG. 2A, the host 202 may instruct the NVM subsystem 212 to store data belonging to namespaces indicated by NSID 1, NSID 2, and NSID 3 in Reclaim Unit 0, Reclaim Unit 1, and Reclaim Unit 2, respectively, in the sequence indicated by the numbers in the rounded rectangles in FIG. 2 and indicated by the numbers in brackets as follows. For example, data [1] for a first write command associated with NSID 1 may be written to a first portion of the top memory block 208 of Reclaim Unit 0 of Reclaim Group 0. A first portion of data [2a] for a second write command associated with NSID 1 may be written in the remaining portion of the top memory block 208 of Reclaim Unit 0 of Reclaim Group 0, and a second portion of data [2b] for the second write command associated with NSID 1 may be written in a first portion of the second memory block 208 from the top of Reclaim Unit 0 of Reclaim Group 0. Data [3] for a third write command associated with NSID 2 may be written to a first portion of the top memory block 208 of Reclaim Unit 1 of Reclaim Group 0. Data [4] for a fourth write command associated with NSID 3 may be written to a first portion of the top memory block 208 of Reclaim Unit 0 of Reclaim Group 1. Data [5] for a fifth write command associated with NSID 3 may be written to a next portion of the top memory block 208 of Reclaim Unit 0 of Reclaim Group 1. Data [6] for a sixth write command associated with NSID 1 may be written to a next portion of the second memory block 208 from the top of Reclaim Unit 0 of Reclaim Group 0. A first portion of data [7a] for a seventh write command associated with NSID 1 may be written in the remaining portion of the second memory block 208 from the top of Reclaim Unit 0 of Reclaim Group 0, and a second portion of data [7b] for the seventh write command associated with NSID 1 may be written in a first portion of the third memory block 208 from the top of Reclaim Unit 0 of Reclaim Group 0. A first portion of data [8a] for an eighth write command associated with NSID 2 may be written in the remaining portion of the top memory block 208 of Reclaim Unit 1 of Reclaim Group 0, and a second portion of data [8b] for the eighth write command associated with NSID 2 may be written in a first portion of the second memory block 208 from the top of Reclaim Unit 1 of Reclaim Group 0. A first portion of data [9a] for a ninth write command associated with NSID 3 may be written in the remaining portion of the top memory block 208 of Reclaim Unit 0 of Reclaim Group 1, and a second portion of data [9b] for the ninth write command associated with NSID 3 may be written in a first portion of the second memory block 208 from the top of Reclaim Unit 0 of Reclaim Group 1.

Referring to FIG. 2B, the host 202 may continue sending write commands and associated write data that it may instruct the NVM subsystem 212 to store in reclaim units corresponding to the respective namespaces using write commands in the sequence indicated by the numbers in the rounded rectangles which may correspond to data for the associated write commands.

Referring to FIG. 2C, the host may deallocate some or all of the data belonging to NSID 1 as shown by solid shading. For example, the data associated with any of the first, second, sixth, seventh, thirteenth, fourteenth, and/or seventeenth write commands may be deallocated at different times (with various amounts of time therebetween), in various combinations at different times, or all at once. Depending on the implementation details, this may enable the NVM subsystem 212 to erase Reclaim Unit 0 (as shown without shading in FIG. 2D) without moving data belonging to other namespaces, thereby reducing or eliminating write amplification. Although FIG. 2D may illustrate a reclaim unit handle 236 referencing a reclaim unit 214 having one or more memory blocks 208 that may be erased, in some embodiments, one or more deallocated memory blocks 208 may be returned to a pool of available memory prior to being erased. Thus, in some embodiments, the memory blocks 208 indicated as being erased in FIG. 2D may not be the same memory blocks indicated as being deallocated in FIG. 2C but instead may be other memory blocks that may have previously been erased (e.g., when it was in a pool of free blocks and/or not referenced by a reclaim unit handle 236) and arranged into a new (e.g., empty) reclaim unit 214. In some embodiments, in addition to namespaces, and/or as an alternative to namespaces, data may be divided and/or arranged into groups based on logical block addresses (LBAs), one or more applications that may use the data, host write traffic threads, and/or the like, for separating and/or managing data based on reclaim unit handles, reclaim units, erase units, and/or the like.

Figure 3A:
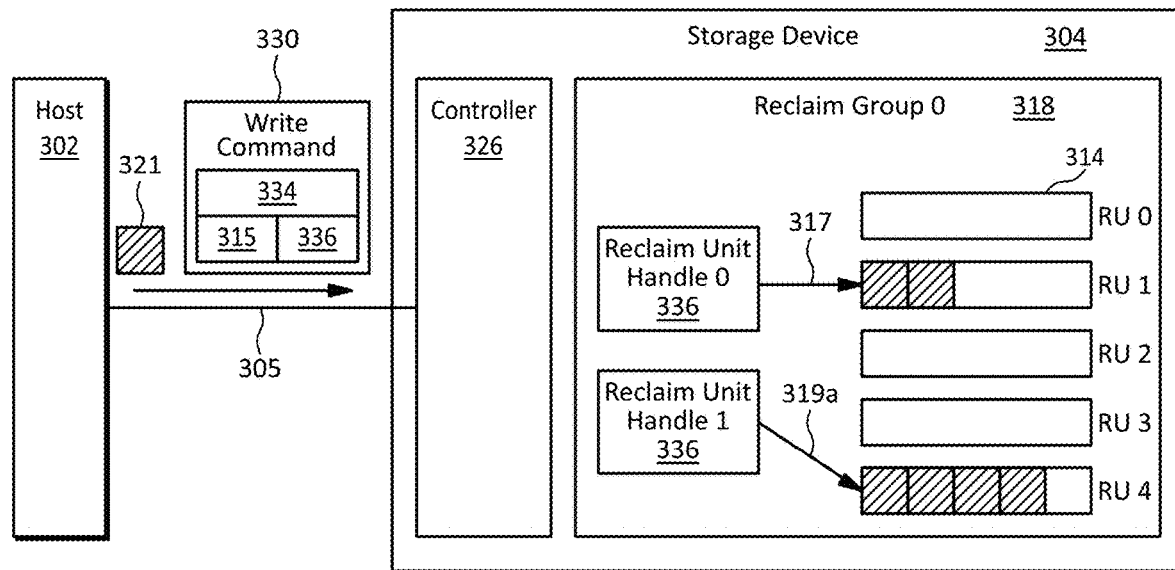
FIG. 3A illustrates an embodiment of a flexible data placement scheme with reference modification in a first data placement state in accordance with example embodiments of the disclosure.
Figure 3B:
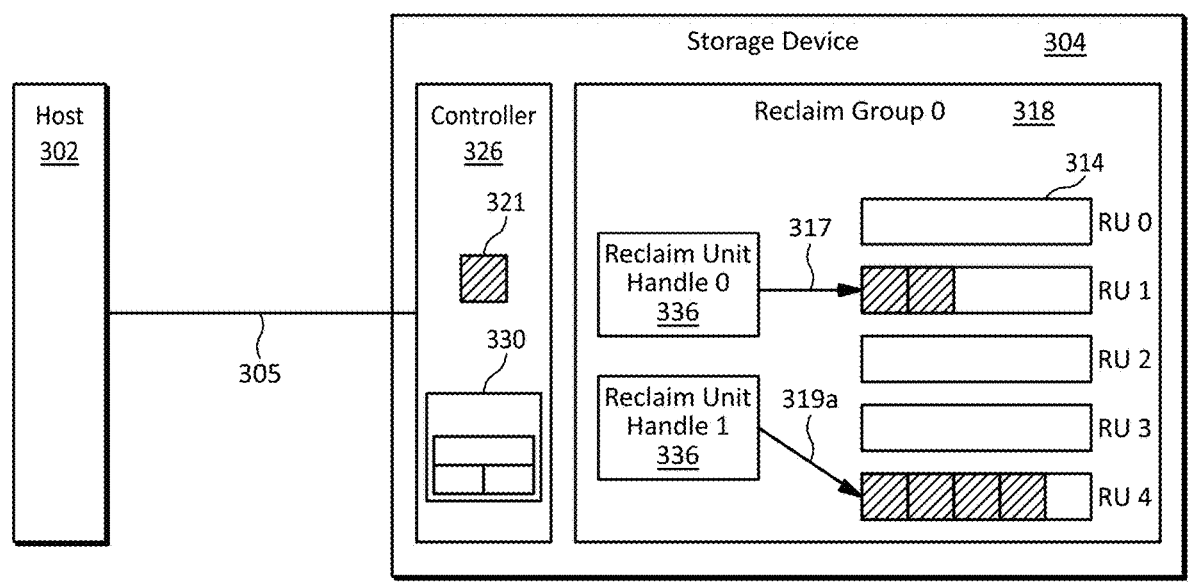
FIG. 3B illustrates the embodiment of the data placement scheme illustrated in FIG. 3A in a second data placement state in accordance with example embodiments of the disclosure.
Figure 3C:
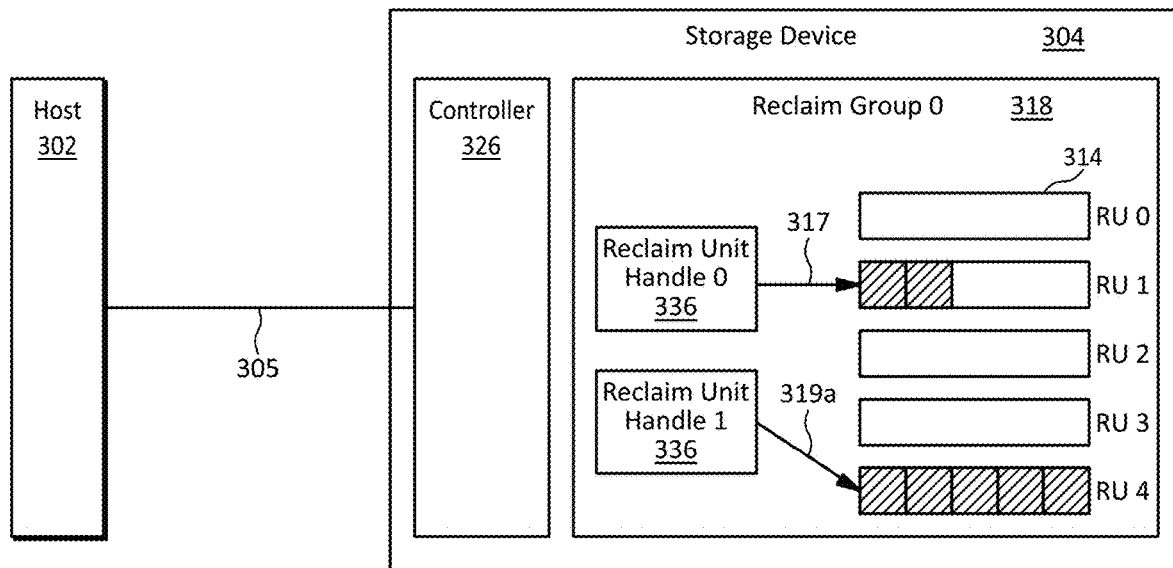
FIG. 3C illustrates the embodiment of the data placement scheme illustrated in FIG. 3A in a third data placement state in accordance with example embodiments of the disclosure.
Figure 3D:
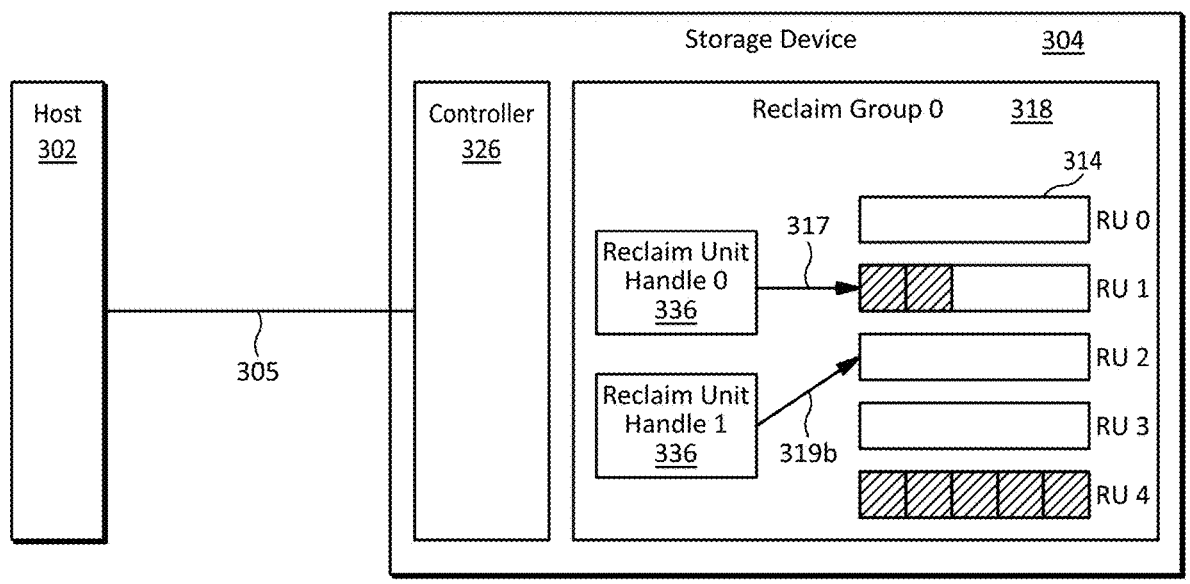
FIG. 3D illustrates the embodiment of the data placement scheme illustrated in FIG. 3A in a fourth data placement state in accordance with example embodiments of the disclosure.

FIG. 3A illustrates an embodiment of a flexible data placement scheme with reference modification in a first data placement state in accordance with example embodiments of the disclosure. FIG. 3B illustrates the embodiment of the data placement scheme illustrated in FIG. 3A in a second data placement state in accordance with example embodiments of the disclosure. FIG. 3C illustrates the embodiment of the data placement scheme illustrated in FIG. 3A in a third data placement state in accordance with example embodiments of the disclosure. FIG. 3D illustrates the embodiment of the data placement scheme illustrated in FIG. 3A in a fourth data placement state in accordance with example embodiments of the disclosure.

FIG. 3A. FIG. 3B, FIG. 3C, and/or FIG. 3D may be referred to collectively and/or individually as FIG. 3.

The embodiment illustrated in FIG. 3 may include a host 302 and a storage device 304 communicating using a communication connection 305. The storage device 304 may include a controller 326 (which may control the overall operation of the storage device 304) and storage media including reclaim units 314 arranged in one or more reclaim groups 318. One reclaim group 318 referred to as Reclaim Group 0 is illustrated in FIG. 3, but the reclaim units 314 may be arranged in any number of reclaim groups 318. For purposes of illustration, in the embodiment illustrated in FIG. 3, Reclaim Group 0 may include five reclaim units 314 identified as RU 0, RU 1, RU 2, RU 3, and RU 4, each of which may have a storage capacity of five pages of data, but any number and/or size of reclaim units may be used. For example, in a practical implementation, a reclaim unit may include one, two, four, or more erase blocks, each of which may have a storage capacity measured in MB or GB and page size measured in KB.

One or more reclaim unit handles 336 may reference corresponding reclaim units 314. For example, as shown in FIG. 3A, a first reclaim unit handle 336 identified as Reclaim Unit Handle 0 (or RUH 0) may reference RU 1 as indicated by arrow 317. A second reclaim unit handle 336 identified as Reclaim Unit Handle 1 (RUH 1) may reference RU 4 as indicated by arrow 319a.

Referring to FIG. 3A, the storage device 304 may be shown in an initial state in which two pages of data may be stored in the reclaim unit 314 identified as RU 1, and four pages of data may be stored in the reclaim unit 314 identified as RU 4 as shown by the diagonally shaded portions of RU 1 and RU 4.

The host 302 may send a write command 330 and a page of data 321 (or an address, pointer, or other indicator of a location of the page of data 321) to the storage device 304 using communication connection 305. The command 330 may include a placement identifier 334 that may include a reclaim group identifier 315 and/or reclaim unit handle 336. In the example illustrated in FIG. 3, the reclaim group identifier 315 and reclaim unit handle 336 may instruct the storage device 304 to store the page of data 321 at the reclaim unit 314 referenced by Reclaim Unit Handle 1 in Reclaim Group 0.

In some embodiments, the command 330 and/or the placement identifier 334 may use a different technique to specify a reclaim unit into which the data 321 is to be written. For example, rather than directly provide a reclaim unit handle 336, the command 330 and/or placement identifier 334 may include a placement handle that may specify a reclaim unit handle, for example, as illustrated in the embodiment described with respect to FIG. 4.

Referring to FIG. 3B, the controller 326 may receive the write command 330 and/or page of data 321. Based on the reclaim group identifier 315 and reclaim unit handle 336 in the placement identifier 334 included in the write command 330, the controller 326 may determine that the page of data 321 should be stored in the reclaim unit 314 referenced by Reclaim Unit Handle 1 in Reclaim Group 0. In the example illustrated in FIG. 3B, Reclaim Unit Handle 1 may reference the reclaim unit 314 identifies as RU 4, and thus, the controller 326 may store the page of data 321 in RU 4 as shown in FIG. 3C.

Referring to FIG. 3D, the page of data 321 may have filled the reclaim unit 314 indicated as RU 4 as shown with diagonal shading. Thus, the controller 326 may modify the Reclaim Unit Handle 1 to reference a different (e.g., empty) reclaim unit 314 within Reclaim Group 0 such as RU 2 as shown by arrow 319b. The controller 326 may then proceed to fill RU 2 with data received from the host using write commands 330 that specify Reclaim Unit Handle 1 in the placement identifier 334.

Figure 4:
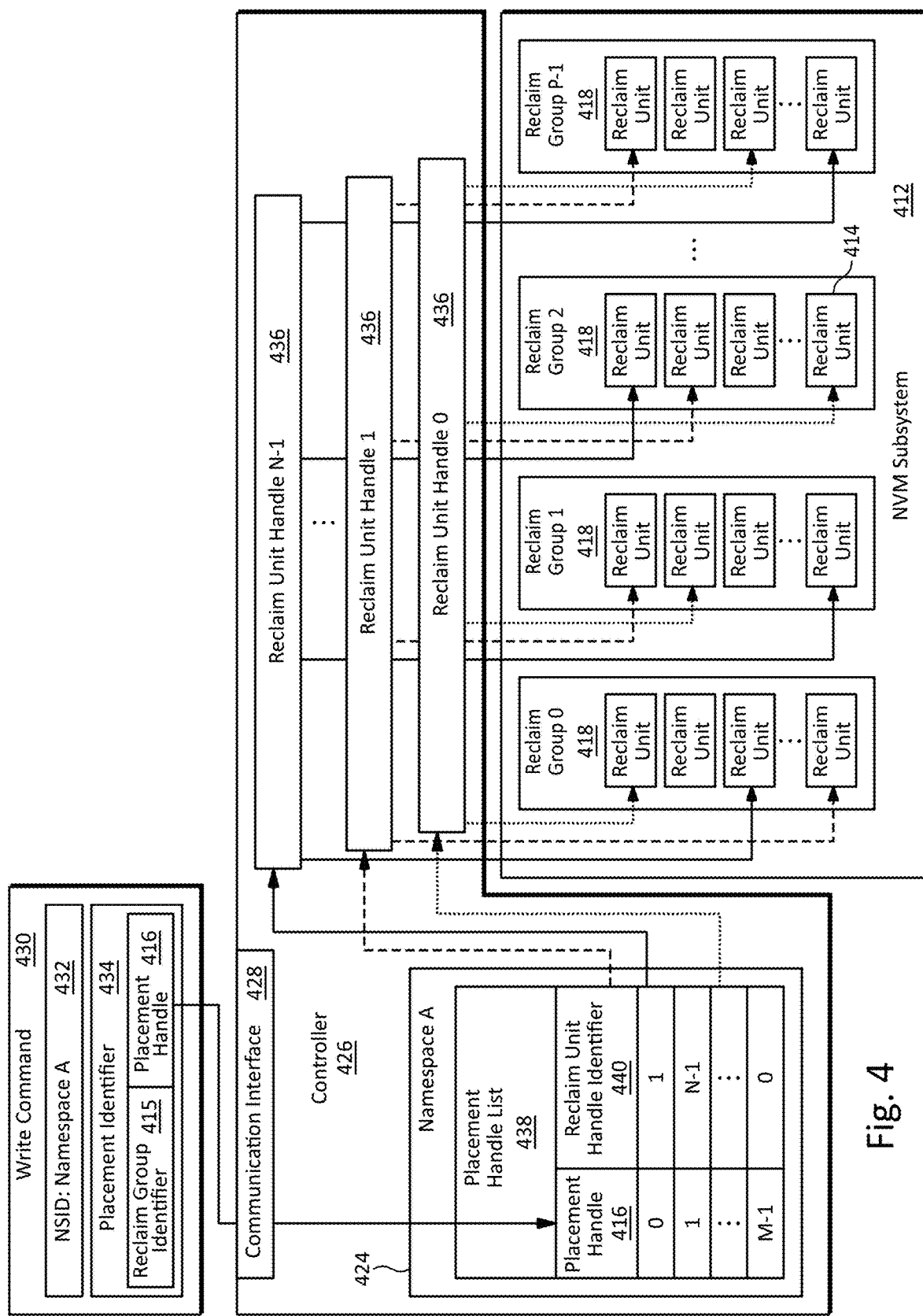
FIG. 4 illustrates an embodiment of a flexible data placement scheme having reclaim unit handles in accordance with example embodiments of the disclosure.

FIG. 4 illustrates an embodiment of a flexible data placement scheme having reclaim unit handles in accordance with example embodiments of the disclosure. The embodiment illustrated in FIG. 4 may include a controller 426 and an NVM subsystem 412 that may be located, for example, in a storage device. The NVM subsystem 412 may include P reclaim groups 418 identified as Reclaim Group 0 through Reclaim Group P-1. A reclaim group 418 may include one or more reclaim units 414.

The controller 426 may receive I/O commands 430 from a host through a communication interface 428. An I/O command 430, which in the example illustrated in FIG. 4 may be a write command, may include a namespace identifier (NSID) 432 and/or a placement identifier 434. The placement identifier 434 may include a reclaim group identifier 415 and/or a placement handle 416 that may enable a host to specify a reclaim group 418 and/or a reclaim unit 414, respectively, within the reclaim group 418 to use to store data associated with the write command 430. Thus, in some embodiments, the scheme illustrated in FIG. 4 may enable a host to align data that may be deallocated together (e.g., data belonging to a namespace) with one or more reclaim units 414 that may be erased as units.

In some embodiments, a placement handle 416 may map to a reclaim unit handle (RUH) 436 that may reference one or more reclaim units 414 in one or more reclaim groups 418. For example, a reclaim unit handle may map to one reclaim unit 414 in each reclaim group 418. (FIG. 4 shows example mappings from each reclaim unit handle 436 to one reclaim unit in each reclaim group 418.) In the embodiment illustrated in FIG. 4, the controller may use N reclaim unit handles 436 identified as Reclaim Unit Handle 0 through Reclaim Unit Handle N-1. In some embodiments, the reclaim unit handles 436 may be characterized as a controller resource.

The controller 426 may use a placement handle list 438 to map one or more placement handles 416 to one or more RUH identifiers (RUH IDs) 440, which in turn may identify a corresponding reclaim unit handle 436. In the embodiment illustrated in FIG. 4, the placement handle list 438 may include M placement handles identified as Placement Handle 0 through Placement Handle M-1.

In some embodiments, a placement handle 416 may be scoped to a namespace 424 (in this example, a namespace identified as Namespace A). The namespace may, in turn, encompass one or more (e.g., all) reclaim units 414 referenced by the one or more reclaim unit handles 436 identified in the placement handle list 438 (e.g., by RUH IDs 440). In some embodiments, the placement handle list 438 may be created, populated, revised, maintained, and/or the like, by a host, a storage device (e.g., the controller 426), or any other entity or combination thereof. In some embodiments, in addition to namespaces, and/or as an alternative to namespaces, data may be divided and/or arranged into groups based on logical block addresses (LBAs), one or more applications that may use the data, host write traffic threads, and/or the like, for separating and/or managing data based on reclaim unit handles, reclaim units, erase units, and/or the like.

In some embodiments, the use of the placement handles 416 and/or reclaim unit handles 436 may enable the flexible data placement scheme illustrated in FIG. 4 to present a reclaim unit to a host as a logical representation of physical nonvolatile storage within a reclaim group that may be physically erased by the controller 426, for example, without disturbing other reclaim units 414. The controller 426 may implement a logical reclaim unit specified by a host (e.g., using a placement identifier 434) with physical storage media (e.g., one or more erase blocks on an NVM die) that may be selected by the controller 426 and erased as a unit.

In some embodiments, the selection of a reclaim unit 414 and/or reclaim group 418 may be performed, at least partially, by the controller 426. For example, if the controller 426 receives a write command 430 that does not include a placement identifier 434, the controller may use a reclaim unit handle 436 mapped by a default placement handle 416 (e.g., Placement Handle 0) and select a reclaim group 418, thereby selecting the reclaim unit 414 that is within the selected reclaim group 418 and referenced by the reclaim unit handle 436 mapped by the default placement handle 416. As another example, if the controller 426 receives a write command 430 with a placement identifier that includes a placement handle 416 but not a reclaim group identifier 415, the controller 426 may select a reclaim unit 414 by selecting a reclaim group 418 and using the reclaim unit 414 that is within the selected reclaim group 418 and referenced by the reclaim unit handle 436 mapped by the placement handle 416 provided with the write command 430.

In some embodiments, the flexible data placement scheme illustrated in FIG. 4 may be implemented at least partially using an NVMe protocol. In such an embodiment, placement identifier 434 may be implemented as a portion of the command 430 (e.g., a directive portion of an NVMe command); M, N, and/or P may be parameters that may be configured, for example, using an NVMe Namespace Management command; the controller 426 may be implemented with one or more NVMe controllers; and/or the NVM subsystem 412 may be implemented as an NVMe subsystem, an endurance group (which, in some embodiments may be coextensive with a storage device), an NVMe domain, and/or the like, or any combination thereof. In an embodiment implemented at least partially using an NVMe protocol, a directive specific (DSPEC) field may be used to provide a placement identifier (e.g., a reclaim group (which may be indicated by a reclaim group identifier) and a placement handle). A DSPEC field may be used, for example, in an implementation in which a directive type (DTYPE) field may be used to indicate that a flexible data placement feature is used. In such an embodiment, an invalid and/or default (e.g., all zeros) value of a DSPEC field may indicate the absence of a reclaim group indicator and/or placement handle.

In the embodiments of flexible data placement schemes illustrated in FIG. 2, FIG. 3, and/or FIG. 4, a reclaim unit may be implemented (at least from the perspective of a host) as a logical representation of an underlying portion of physical storage media. Thus, the host may be shielded from, and/or not aware of, one or more ongoing operations and/or conditions of the storage device that may adversely affect one or more operations involving a physical implementation of a logical reclaim unit selected by the host.

For example, in the embodiment illustrated in FIG. 4, a host may send a write command 430 with a placement identifier 434 including a reclaim group identifier 415 and a placement handle 416 that may specify a specific reclaim unit 414 for storing data associated with the write command. However, the controller 426 may have implemented the specified reclaim unit 414 with physical storage media (e.g., a nonvolatile memory (NVM) die) that may be busy with a read operation. Thus, the write operation requested by write command 430 may be delayed until the read operation is completed.

Other examples of ongoing operations and/or conditions of the storage device that may be unknown to a host and may adversely affect one or more operations involving a physical implementation of a logical reclaim unit selected by the host may include: NVM die management conflicts; programming operations involving programming data from a write buffer in a controller into a reclaim unit selected by the host; erase operations being conducted by a die containing a reclaim unit selected by the host; garbage collection operations involving a reclaim unit selected by the host; and/or the like.

Moreover, to the extent a host may gain an awareness of one or more operations of the physical storage media underlying the flexible data placement scheme illustrated in FIG. 4 by observing the behavior (e.g., NVM die programming delays, erasure delays, and/or the like), the host's awareness may be delayed, for example, due to NVM channel delays, controller delay, communication connection delay (e.g., PCIe delay), host central processing unit (CPU) delay, and/or the like.

In a flexible data placement scheme in accordance with example embodiments of the disclosure, a storage device to select a reclaim unit and/or reclaim group (e.g., to use for storing data associated with a write request) based on one or more operations and/or conditions of the storage device.

For example, as described above, in some cases (e.g., when a controller 426 receives a write command 430 that does not include a placement handle 416 or includes a placement handle 416 but not a reclaim group identifier 415) a controller 426 may select a reclaim unit 414 and/or reclaim group 418 to use for storing data associated with a write command. In such a case, the controller 426 may base the selection of the reclaim unit 414 and/or reclaim group 418, at least partially, on one or more operations of the storage device that may affect the performance of a write operation associated with the write command. For example, the controller 426 may select a reclaim unit 414 and/or reclaim group 418 that is implemented with physical storage media (e.g., an NVM die) that is not currently busy with a program (e.g., write) operation, a read operation, an erase operation, a garbage collection operation, and/or the like. As another example, the controller 426 may select a reclaim unit 414 and/or reclaim group 418 having a command queue with no or relatively few pending commands. As a further example, a controller may select a reclaim unit 414 and/or reclaim group 418 based on an opportunistic status such as an NVM die that is approaching the completion of a programming cycle, an associated write buffer that is nearing a full word line, and/or an open block timer that is nearing expiration.

Additionally, or alternatively, the controller 426 may base the selection of the reclaim unit 414 and/or reclaim group 418, at least partially, on one or more conditions of the storage device that may affect the performance of a write operation associated with the write command. For example, the controller 426 may avoid selecting a reclaim unit and/or reclaim group in which an NVM die may be exhibiting end-of-life (EOL) behavior such as relatively low operation speed, relatively high bit error accumulation rate, voltage shifts, and/or the like. Additionally, or alternatively, the controller 426 may select a reclaim unit and/or reclaim group in which the physical storage media may exhibit relatively young behavior.

In some embodiments, an operation of a storage device may refer to an ongoing operation such as a read, write, and/or erase operation that is currently being performed, a command queue that currently contains a relatively large number of commands, a write buffer that is currently nearing a full word line, and/or the like. In some embodiments, an ongoing operation may be in contrast to a previous operation such as a previous selection of a reclaim unit based on a round-robin technique or a wear leveling technique. In some embodiments, a wear leveling technique may manage the behavior of the NVM to attempt to equalize (at least approximately equalize) the number of program and/or erase (P/E) cycles on one or more (e.g., each) erase block of the NVM. In some embodiments, one or more modifiers may alter the attempt to equalize the P/E cycles, for example, based on one or more ongoing behaviors and/or conditions of the NVM (e.g., fewer P/E cycles may be performed on an erase block that may already have indications of relatively higher wear.

Figure 5:
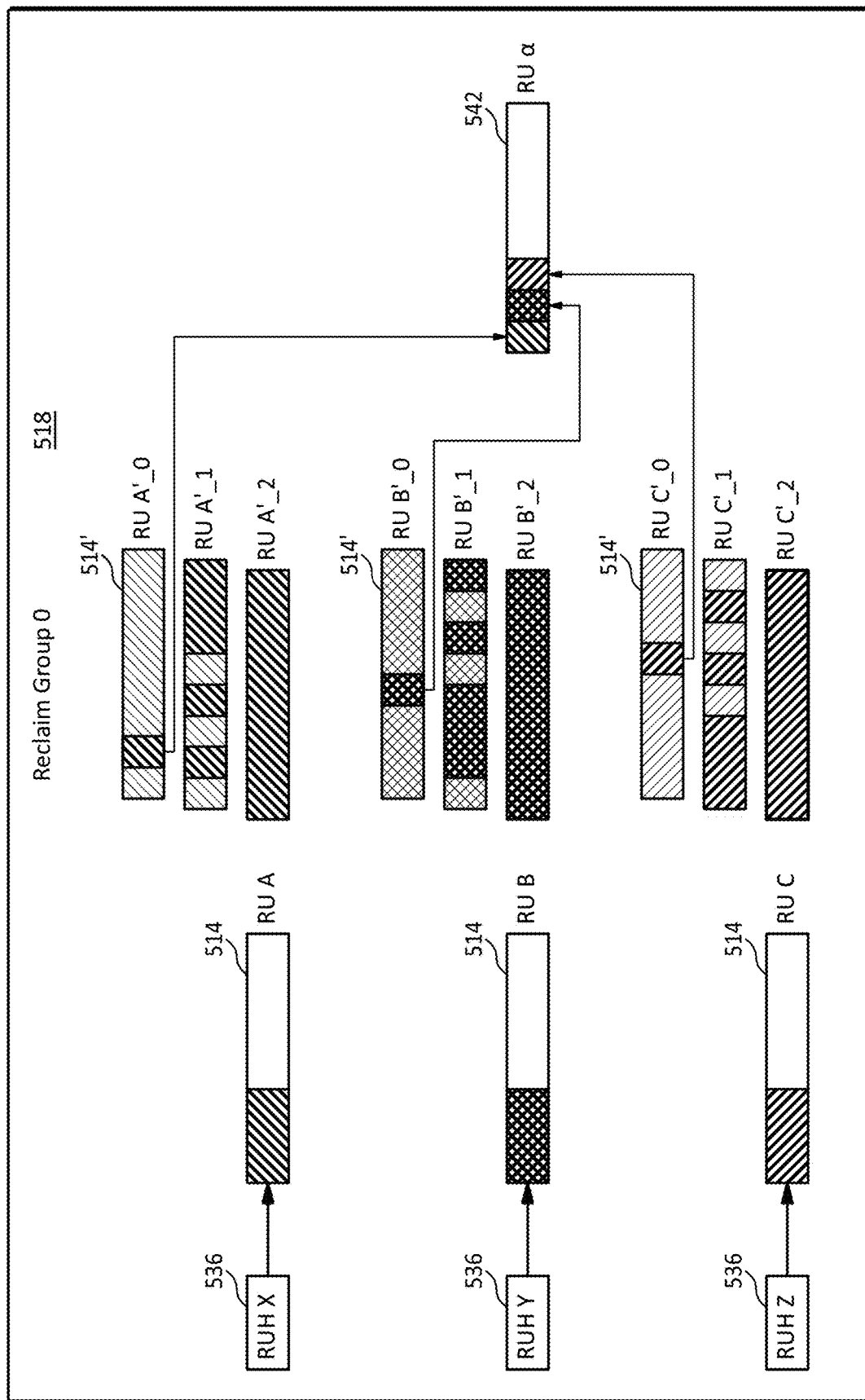
FIG. 5 illustrates an embodiment of an initial isolation scheme for a flexible data placement scheme for a storage device in accordance with example embodiments of the disclosure.

FIG. 5 illustrates an embodiment of an initial isolation scheme for a flexible data placement scheme for a storage device in accordance with example embodiments of the disclosure. The embodiment illustrated in FIG. 5 may include three reclaim unit handles 536 identified as RUH X, RUH Y. and RUH Z.

The reclaim unit handle RUH X may currently reference a reclaim unit 514 identified as RU A. The reclaim unit RU A may be partially filled with data as shown with single diagonal shading with lines running from top right to bottom left. The reclaim unit handle RUH X may have previously referenced reclaim units 514' identified as RU A'_0, RU A'_, and RU A'_2. The previously referenced reclaim units 514' may have been filled with data (as shown with single diagonal shading with lines running from top right to bottom left), for example, when they were referenced by RUH X in a manner similar to the way the reclaim unit 314 identified as RU 4 was filled with data when it was referenced by Reclaim Unit Handle 1 (RUH 1) as illustrated in FIG. 3B and FIG. 3C. Although not currently referenced by RUH X, the previously referenced reclaim units RU A'_0, RU A'_1, and RU A'_2 may still remain associated with RUH X, for example, by using a data structure such as a reclaim unit association table.

The reclaim unit handle RUH Y may currently reference a reclaim unit 514 identified as RU B. The reclaim unit RU B may be partially filled with data as shown with diagonal cross shading. The reclaim unit handle RUH Y may have previously referenced reclaim units 514' identified as RU B'_0, RU B'_1, and RU B'_2. The previously referenced reclaim units 514' may have been filled with data (as shown with diagonal cross shading), for example, when they were referenced by RUH Y.

Likewise, the reclaim unit handle RUH Z may currently reference a reclaim unit 514 identified as RU C. The reclaim unit RU C may be partially filled with data as shown with single diagonal shading with lines running from top left to bottom right. The reclaim unit handle RUH Z may have previously referenced reclaim units 514' identified as RU C'_0, RU C'_1, and RU C'_2. The previously referenced reclaim units 514' may have been filled with data (as shown with single diagonal shading with lines running from top left to bottom right), for example, when they were referenced by RUH Z.

In some embodiments, a controller within a storage device may perform one or more operations (e.g., maintenance operations) on data stored in previously referenced reclaim units 514'. For example, some or all of the data stored in the previously referenced reclaim units 514' may be deallocated (e.g., by a host), thereby resulting in unused storage capacity in the previously referenced reclaim units 514'. This is illustrated in FIG. 5 in which the portions of the previously referenced reclaim units 514' containing deallocated (e.g., invalid) data are shown with shading having relatively thinner lines.

In some embodiments, a controller may perform one or more maintenance operations to enable the unused storage capacity in the previously referenced reclaim units 514' to be erased, reused, repurposed, and/or the like. For example, a controller may perform a garbage collection operation in which valid data (e.g., data that has not been deallocated) in one or more of the previously referenced reclaim units 514' may be copied to a different reclaim unit so the one or more of the previously referenced reclaim units 514' may be erased and reused.

The embodiment illustrated in FIG. 5 may implement an initial isolation scheme in which data written to reclaim units that are currently, or were previously, referenced by different reclaim unit handles 536 may be initially isolated from each other. (In some embodiments, data may be considered isolated if the reclaim unit in which it is stored only includes data that was written to the reclaim unit using the same reclaim unit handle.) Thus, reclaim units RU A. RU A'_0, RU A'_1, and RU A'_2 may only include data that was written when these reclaim units were referenced by RUH X. Similarly, reclaim units RU B, RU B'_0, RU B'_1, and RU B'_2 may only include data that was written when these reclaim units were referenced by RUH Y. and reclaim units RU C. RU C'_0, RU C'_1, and RU C'_2 may only include data that was written when these reclaim units were referenced by RUH Z.

However, as part of a controller operation, data from reclaim units that were written using different reclaim unit handles may be combined in a single reclaim unit. This is illustrated in FIG. 5 in which a controller may read valid data from previously referenced reclaim units RU A'_0, RU B'_0, and RU C'_0 and write them to a reclaim unit 542 identified as RU a. Because the valid data copied from the previously referenced reclaim units RU A'_0, RU B'_0, and RU C'_0 may be the last remaining valid data in one or more of these reclaim units, one or more of the reclaim units RU A'_0, RU B'_0, and/or RU C'_0 may be erased, e.g., as part of a garbage collection operation to be reused for storing other data. A reclaim unit that has been erased (e.g., garbage collected) may be removed from a reclaim unit association table that it may have been listed in.

In some embodiments, the isolation scheme illustrated in FIG. 5 may be referred to as an initial isolation scheme because data written using different reclaim unit handles 536 may be initially isolated in different reclaim units, but may eventually be combined, for example, by a subsequent operation such as a garbage collection operation, a media management operation (e.g., refresh program, read disturb), and/or the like. In some embodiments, the isolation scheme illustrated in FIG. 5 may be referred to as a host isolation scheme because the host may determine (e.g., using reclaim unit handles) the placement of data in isolated reclaim units.

TABLE 1

Reclaim Unit Association Table

| Reclaim Unit Handle X | Reclaim Unit Handle Y | Reclaim Unit Handle Z |
| --- | --- | --- |
| RU A'_0 | RU B'_0 | RU C'_0 |
| RU A'_1 | RU B'_1 | RU C'_1 |
| RU A'_2 | RU B'_2 | RU C'_2 |
| ... | ... | ... |

Although one reclaim group 518 is illustrated in FIG. 5, the reclaim units 514 may be arranged in any number of reclaim groups. In some embodiments, data from reclaim units in different reclaim groups (e.g., valid data from previously referenced reclaim units in different reclaim groups) may be combined in the same reclaim unit.

Figure 6:
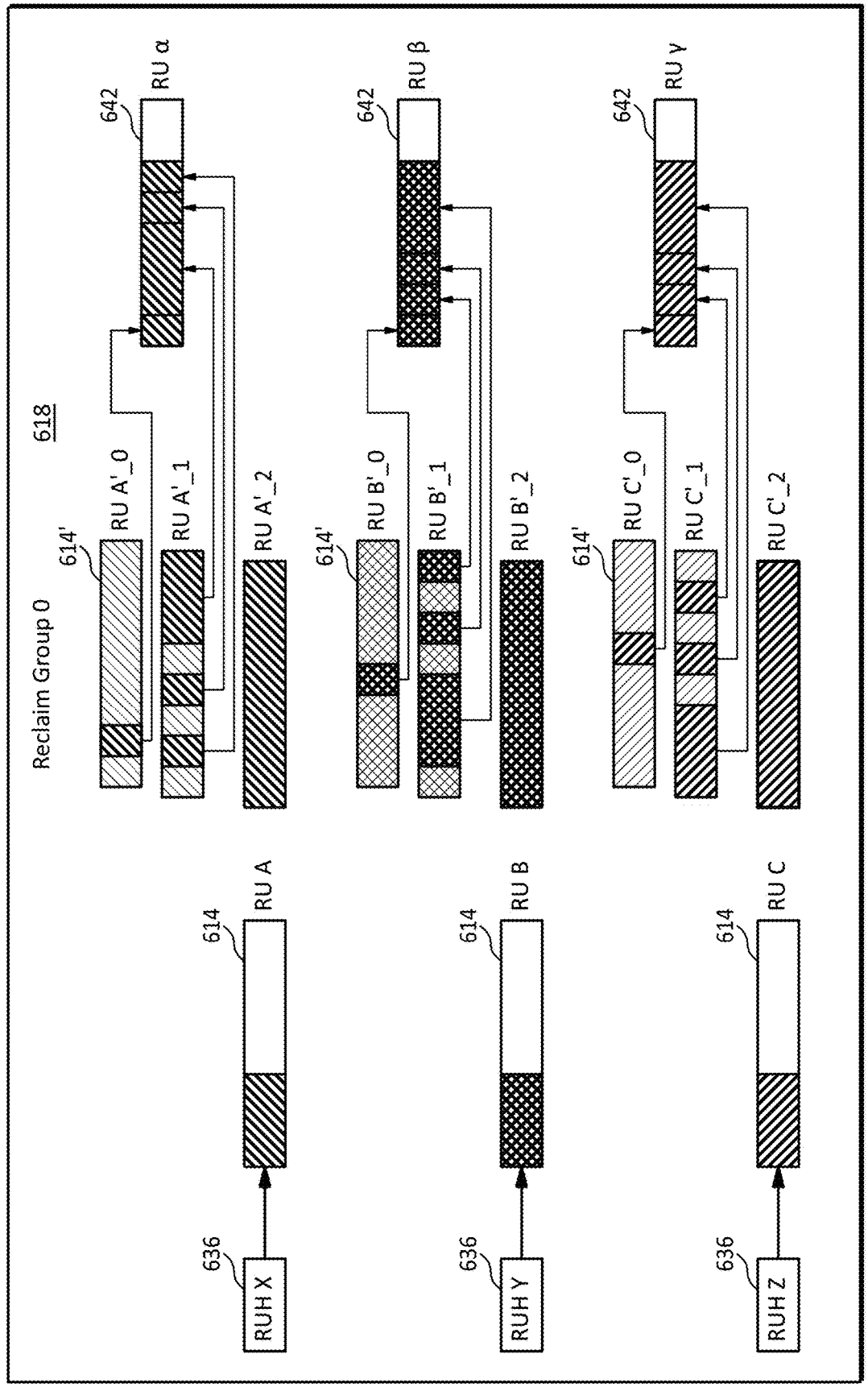
FIG. 6 illustrates an embodiment of a persistent isolation scheme for a flexible data placement scheme for a storage device in accordance with example embodiments of the disclosure.

FIG. 6 illustrates an embodiment of a persistent isolation scheme for a flexible data placement scheme for a storage device in accordance with example embodiments of the disclosure. The embodiment illustrated in FIG. 6 may include three reclaim unit handles 636 identified as RUH X, RUH Y, and RUH Z that may be used to write data to currently referenced reclaim units 614 and/or previously referenced reclaim units 614' in a manner similar to that described above with respect to FIG. 5.

However, the isolation scheme illustrated in FIG. 6 may involve more isolation of data that was written using different reclaim unit handles compared to the embodiment described above with respect to FIG. 5. For example, in the embodiment illustrated in FIG. 6, in a controller operation that may move data from previously referenced reclaim units 614', data that was written using different reclaim unit handles may not be combined in a single reclaim unit. This is illustrated in FIG. 6 in which a controller may read valid data from (e.g., only from) previously referenced reclaim units RU A'_0, RU A'_1, and/or RU A'_2 which were written using the same reclaim unit handle RUH X and write it to a reclaim unit 642 identified as RU a. However, in some embodiments, reclaim unit RU a may not receive data from reclaim units that were written using other reclaim handles such as RUH Y and/or RUH Z.

Similarly, a controller may read valid data from (e.g., only from) previously referenced reclaim units RU B'_0, RU B'_1, and/or RU B'_2 which were written using the same reclaim unit handle RUH Y and write it to a reclaim unit 642 identified as RU p. A controller may also read valid data from (e.g., only from) previously referenced reclaim units RU C'_0. RU C'_1, and/or RU C'_2 which were written using the same reclaim unit handle RUH Z and write it to a reclaim unit 642 identified as RU y. Thus, in some embodiments, data written to one or more of the reclaim units 642 may be read from (e.g., only read from) one or more reclaim units that were written using the same reclaim unit handle.

If the valid data read from any of the previously referenced reclaim units 614' was the last remaining valid data in the reclaim unit, the reclaim unit may be erased. e.g., as part of a garbage collection operation to be reused for storing other data.

In some embodiments, the isolation scheme illustrated in FIG. 6 may be referred to as a persistent isolation scheme because the isolation between data written using different reclaim unit handles may continue beyond the writing and/or deallocating operations, for example, to include one or more garbage collection and/or other controller operations. In some embodiments, the isolation scheme illustrated in FIG. 6 may be referred to as a fully or totally isolated scheme because the isolation between data written using different reclaim unit handles may continue throughout the lifecycle of the data in a storage device.

Although one reclaim group 618 may be illustrated in FIG. 6, the reclaim units 614 may be arranged in any number of reclaim groups. In some embodiments, data from reclaim units in different reclaim groups (e.g., valid data from previously referenced reclaim units in different reclaim groups) may be combined in the same reclaim unit.

Figure 7A:
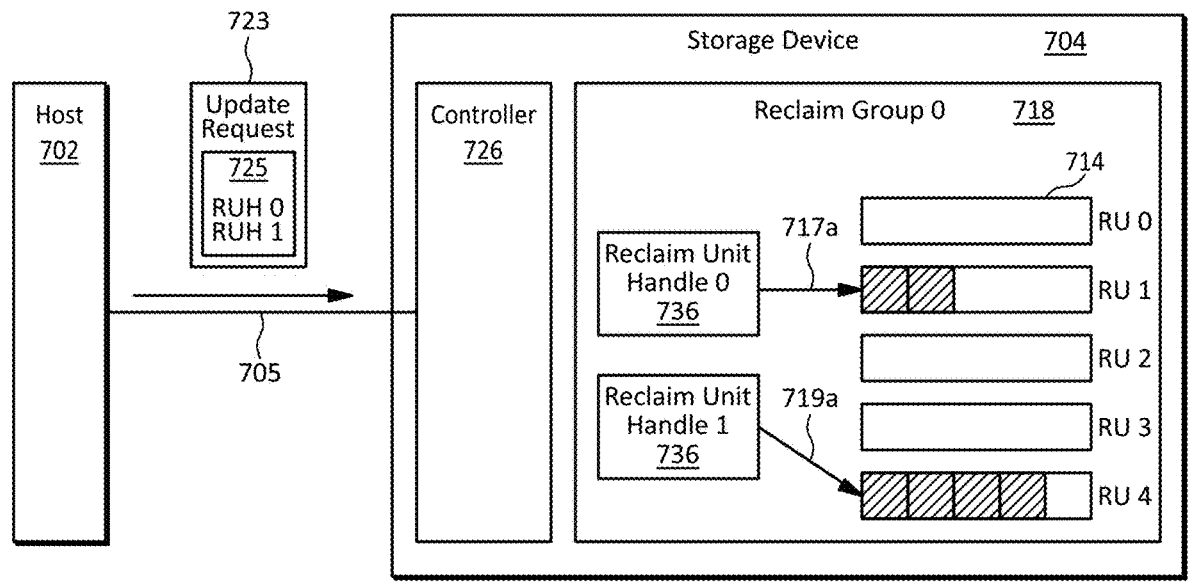
FIG. 7A illustrates an embodiment of an update operation for a flexible data placement scheme in a first state in accordance with example embodiments of the disclosure.
Figure 7B:
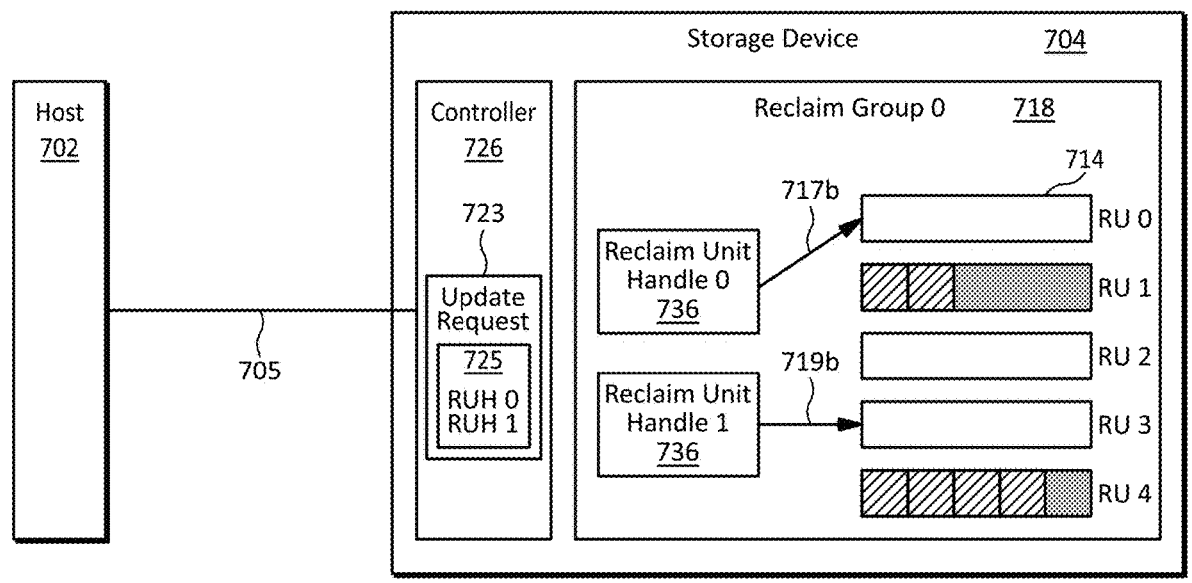
FIG. 7B illustrates the embodiment of the update operation illustrated in FIG. 7A in a second state in accordance with example embodiments of the disclosure.

FIG. 7A illustrates an embodiment of an update operation for a flexible data placement scheme in a first state in accordance with example embodiments of the disclosure. FIG. 7B illustrates the embodiment of the update operation illustrated in FIG. 7A in a second state in accordance with example embodiments of the disclosure. FIG. 7A and FIG. 7B may be referred to collectively and/or individually as FIG. 7.

The embodiment illustrated in FIG. 7 may include a host 702 and a storage device 704 communicating using a communication connection 705. The storage device 704 may include a controller 726, which may control the overall operation of the storage device 704, and storage media including reclaim units 714 arranged in one or more reclaim groups 718.

One reclaim group 718 referred to as Reclaim Group 0 is illustrated in FIG. 7, but the reclaim units 714 may be arranged in any number of reclaim groups 718. For purposes of illustration, in the embodiment illustrated in FIG. 7. Reclaim Group 0 may include five reclaim units 714 identified as RU 0, RU1, RU 2, RU 3, and RU 4, each of which may have a storage capacity of five pages of data, but any number and/or size of reclaim units may be used. For example, in a practical implementation, a reclaim unit may include one, two, four, or more erase blocks, each of which may have a storage capacity measured in MB or GB and page size measured in KB.

One or more reclaim unit handles 736 may reference corresponding reclaim units 714. For example. Reclaim Unit Handle 0 (RUH 0) may reference reclaim unit RU 1 as indicated by arrow 717a, and Reclaim Unit Handle 1 (RUH 1) may reference reclaim unit RU 4 as indicated by arrow 719a. A reclaim unit handle 736 may reference a reclaim unit 714 in which the controller may store the next page of data using the reclaim unit handle 736.

Referring to FIG. 7A, the storage device 704 may be shown in an initial state in which two pages of data may be stored in the reclaim unit 714 identified as RU 1, and four pages of data may be stored in the reclaim unit 714 identified as RU 4 as shown by the diagonally shaded portions of RU 1 and RU 4. Thus, the storage device 704 may be shown in an initial state that may be similar to the initial state of storage device 304 in FIG. 3A.

Rather than receiving a write command, however, the controller 726 may receive an update request 723 (e.g., using a command, directive, and/or the like). The update request 723 may request an update operation in which the controller 726 may modify one or more reclaim unit handles 736 to reference a new (e.g., empty) reclaim unit 714. The update request 723 may include an update list 725 that may specify one or more reclaim unit handles 736 that may be modified by the update operation. In the example illustrated in FIG. 7A, the update list 725 may include Reclaim Unit Handle 0 and Reclaim Unit Handle 1. In some embodiments, the update request 723 may use a different technique to specify one or more reclaim handles 736 that may be updated. For example, rather than directly provide a reclaim unit handle 736, the update request 723 may include a placement handle that may specify a reclaim unit handle, for example, as illustrated in the embodiment described with respect to FIG. 4.

Referring to FIG. 7B, the controller 726 may perform the requested update operation by modifying Reclaim Unit Handle 0 to reference reclaim unit RU 0 as shown by arrow 717b, and by modifying Reclaim Unit Handle 1 to reference reclaim unit RU 3 as shown by arrow 719b. Thus, data sent with subsequent write commands specifying Reclaim Unit Handle 0 or Reclaim Unit Handle 1 may be written to RU 0 or RU 3, respectively.

As illustrated in FIG. 7B, reclaim units RU 1 and RU 4 may be only partially full after an update operation. However, depending on the physical storage media used to implement the reclaim units 714, leaving a reclaim unit partially full may reduce the reliability, durability, performance, and/or the like, of the reclaim unit and/or the storage media with which it is implemented. Therefore, in the embodiment illustrated in FIG. 7B, the controller 726 may fill some or all of the empty portions of RU 1 and/or RU 4 with fill data such as zeros, random data, and/or controller metadata as shown with solid shading. In some embodiments, controller metadata may include data that may be used by a storage device or a storage device controller such as media behavior tracking information, temporary data that may be used to protect against a power failure event, swap space (e.g., scratch pad space for expanded calculations that may exceed nominal available memory space), and/or the like.

The use of fill data, however, may result in wasted or underutilized storage space. For example, the portions of RU 1 and/or RU 4 shown with fill data in FIG. 7B may not be used to store data until they are reclaimed, for example, by a garbage collection operation.

FIG. 8A illustrates an embodiment of a flexible data placement scheme with data transfer to a reclaim unit in a storage device in a first state in accordance with example embodiments of the disclosure. FIG. 8B illustrates the embodiment illustrated in FIG. 8A in a second state in accordance with example embodiments of the disclosure. FIG. 8A and FIG. 8B may be referred to collectively and/or individually as FIG. 8.

The embodiment illustrated in FIG. 8 may include at least three reclaim units 814 identified as RU 0. RU 1, and/or RU 2, and a reclaim unit handle (RUH) 836.

FIG. 8A illustrates a first state in which RU 0 may be a previously referenced reclaim unit. RU 1 may currently be referenced by reclaim unit handle 836 as shown by arrow 817a, and RU 2 may be empty.

RU 0 may have been previously referenced by reclaim unit handle 836 or any other reclaim unit handle. RU 0 may have been filled when previously referenced by reclaim unit handle 836 or any other reclaim unit handle. RU 0 may include at least a first portion storing valid user data 844 as shown with diagonal shading using heavy lines. RU 0 may include one or more other portions storing deallocated user data 848 as shown with diagonal shading using relatively thinner lines.

RU 1 may include at least a first portion storing valid user data 850 as shown with diagonal shading using heavy lines. RU 1 may include one or more other portions 852 that may be empty (e.g., have been erased and not yet programmed with user data).

FIG. 8B illustrates a second state after an update operation which may be performed, for example, by a controller in which the reclaim units 814 and reclaim unit handle 836 may be located. The update operation may modify the reclaim unit handle 836 to reference the empty reclaim unit RU 2 as shown by arrow 817b. Although no longer referenced by the reclaim unit handle 836, RU 1 may remain associated with the reclaim unit handle 836 as shown by dashed arrow 827. Thus. RU 1 may be referred to as a previously referenced or dereferenced reclaim unit.

Based on the update operation, at least a portion of the valid user data 844 in RU 0 may be read from RU 0 and written to an empty portion 852 of RU 1 (e.g., copied or moved from RU 0 to RU 1) as shown by arrow 829. Depending on the implementation details, this transfer of data between reclaim units may have one or more effects. For example, storing valid user data in a previously empty portion of RU 1 may utilize storage space in RU 1 that may otherwise have been wasted and/or only marginally useful if filled with fill data. As another example, moving valid user data from RU 0 to RU 1 may enable RU 0 to be reclaimed (e.g., erased, reused, repurposed, returned to a pool of available (e.g., empty, erased, and/or the like) memory for later reuse, and/or otherwise reclaimed. Depending on the implementation details, this may reduce write amplification. For example, one or more write cycles that may otherwise have been used to move the valid user data 844 in RU 0 to a different location as part of a garbage collection operation for RU 0 may instead be used to move the valid user data 844 to RU 1. In some embodiments, the update operation illustrated in FIG. 8 may be characterized as a hybrid and/or partial garbage collection operation.

Further possible implementation details of the embodiment illustrated in FIG. 8 may depend on an isolation scheme applied to RU 1. For example, if RU 1 is implemented with a persistent isolation scheme. RU 0 may only have been previously referenced by (e.g., associated with) reclaim unit handle 836 as shown in FIG. 9. However, if RU 1 is implemented with an initial isolation scheme, RU 0 may have been previously referenced by (e.g., associated with) any reclaim unit handle, including reclaim unit handle 836 as shown in FIG. 10. Moreover, in some embodiments, data transfers between reclaim units may be limited to reclaim units in the same reclaim group.

FIG. 9A illustrates an embodiment of a flexible data placement scheme with data transfer to a reclaim unit using persistent isolation in a storage device in a first state in accordance with example embodiments of the disclosure. FIG. 9B illustrates the embodiment illustrated in FIG. 9A in a second state in accordance with example embodiments of the disclosure. FIG. 9A and FIG. 9B may be referred to collectively and/or individually as FIG. 9.

The embodiment illustrated in FIG. 9, which may implement a persistent isolation scheme, may include at least three reclaim units 914 identified as RU A'_0, RU A, and/or RU 2, and a reclaim unit handle 936 identified as RUH X.

FIG. 9A illustrates a first state in which RU A'_0 may be a previously referenced reclaim unit that was previously referenced by (e.g., currently associated with) RUH X as shown by arrow 931, RU A may currently be referenced by RUH X as shown by arrow 917a, and RU 2 may be empty.

RU A'_0 may have been filled when previously referenced by RUH X. The reclaim unit RU A'_0 may include at least a first portion storing valid user data 944 as shown with diagonal shading using heavy lines, RU A'_0 may include one or more other portions storing deallocated user data 948 as shown with diagonal shading using relatively thinner lines.

RU A may include at least a first portion storing valid user data 950 as shown with diagonal shading using heavy lines, RU A may include one or more other portions 952 that may be empty (e.g., have been erased and not yet programmed with user data).

FIG. 9B illustrates a second state after an update operation which may be performed, for example, by a controller in which the reclaim units 914 and reclaim unit handle 936 may be located. The update operation may modify RUH X to reference the empty reclaim unit RU A (which was previously designated as RU 2 in FIG. 9A) as shown by arrow 917b. Although no longer referenced by RUH X, the reclaim unit RU A'_1 (which was previously designated as RU A in FIG. 9A) may remain associated with the reclaim unit handle 936 as shown by dashed arrow 927. Thus, RU A'_1 may be referred to as a previously referenced or dereferenced reclaim unit.

Based on the update operation, at least a portion of the valid user data 944 in RU A'_0 may be read from RU A'_0 and written to an empty portion 952 of RU A'_1 (e.g., copied or moved from RU A'_0 to RU A'_1) as shown by arrow 929. Thus, based on a persistent isolation scheme, valid user data written to RU A'_1 may only be read from reclaim units referenced, or previously referenced, by RUH X. In some embodiments, data written to RU A'_0 may be limited to data read from reclaim units in the same reclaim group as RU A'_0.

FIG. 10A illustrates an embodiment of a flexible data placement scheme with data transfer to a reclaim unit using initial isolation in a storage device in a first state in accordance with example embodiments of the disclosure. FIG. 10B illustrates the embodiment illustrated in FIG. 10A in a second state in accordance with example embodiments of the disclosure. FIG. 10A and FIG. 10B may be referred to collectively and/or individually as FIG. 10.

The embodiment illustrated in FIG. 10, which may implement an initial isolation scheme, may include at least three reclaim units 1014 identified as RU B'_0, RU A, and/or RU 2, and reclaim unit handles 1036 identified as RUH X and/or RUH Y.

FIG. 10A illustrates a first state in which RU B'_0 may be a previously referenced reclaim unit that was previously referenced by (e.g., currently associated with) RUH Y as shown by arrow 1031, RU A may currently be referenced by RUH X as shown by arrow 1017a, and RU 2 may be empty.

RU B'_0 may have been filled when previously referenced by RUH Y. The reclaim unit RU B'_0 may include at least a first portion storing valid user data 1044 as shown with diagonal shading using heavy lines, RU B'_0 may include one or more other portions storing deallocated user data 1048 as shown with diagonal shading using relatively thinner lines.

RU A may include at least a first portion storing valid user data 1050 as shown with diagonal shading using heavy lines, RU A may include one or more other portions 1052 that may be empty (e.g., have been erased and not yet programmed with user data).

FIG. 10B illustrates a second state after an update operation which may be performed, for example, by a controller in which the reclaim units 1014 and reclaim unit handles 1036 may be located. The update operation may modify RUH X to reference the empty reclaim unit RU A (which was previously designated as RU 2 in FIG. 10A) as shown by arrow 1017b. Although no longer referenced by RUH X, the reclaim unit RU A'_0 (which was previously designated as RU A in FIG. 10A) may remain associated with RUH X as shown by dashed arrow 1027. Thus, RU A'_0 may be referred to as a previously referenced or dereferenced reclaim unit.

Based on the update operation, at least a portion of the valid user data 1044 in RU B'_0 may be read from RU B'_0 and written to an empty portion 1052 of RU A'_0 (e.g., copied or moved from RU B'_0 to RU A'_0) as shown by arrow 1029. Thus, based on the initial isolation scheme, valid user data written to RU A'_0 may be read from reclaim units referenced, or previously referenced, by any reclaim unit handles (e.g., RUH Y). In some embodiments with initial isolation, even though the data written to RU A'_0 may not be limited to data read from reclaim units referenced by, and/or associated with, RUH X, it may still be limited to data read from reclaim units in the same reclaim group as RU A'_0.

Figure 11A:
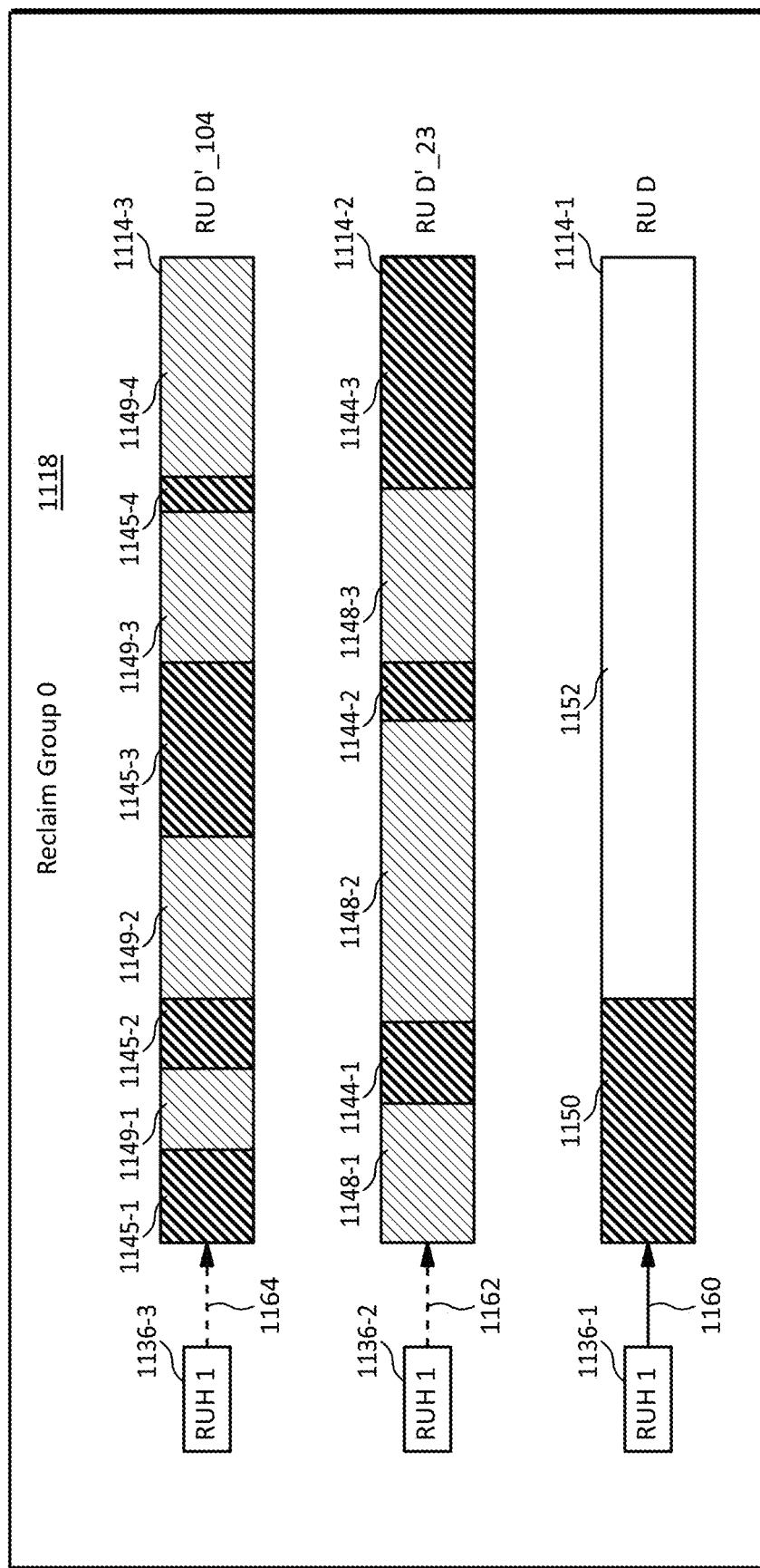
FIG. 11A illustrates a first embodiment of a data transfer operation in a first state for a flexible data placement scheme in accordance with example embodiments of the disclosure.
Figure 11B:
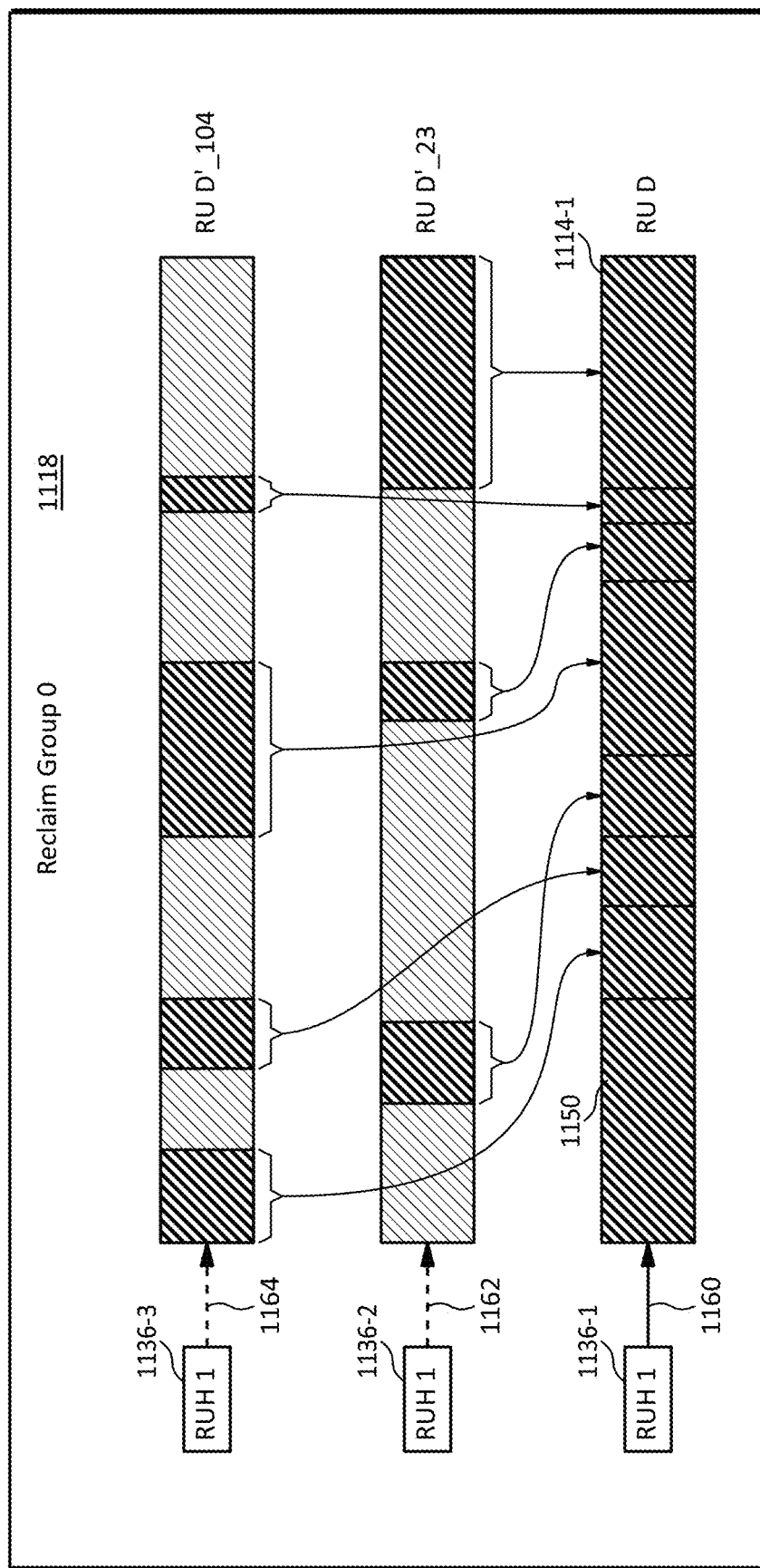
FIG. 11B illustrates the embodiment of the data transfer operation illustrated in FIG. 11A in a second state in accordance with example embodiments of the disclosure.

FIG. 11A illustrates a first embodiment of a data transfer operation in a first state for a flexible data placement scheme in accordance with example embodiments of the disclosure. FIG. 11B illustrates the embodiment of the data transfer operation illustrated in FIG. 11A in a second state in accordance with example embodiments of the disclosure. The embodiment illustrated in FIG. 11A and FIG. 1B may be used, for example, with any of the update operations disclosed herein, including those described with respect to FIG. 8, FIG. 9, and/or FIG. 10.

Referring to FIG. 11A, a reclaim unit 1114-1 identified as RU D may include a first portion in which user data 1150 may be stored as shown with diagonal shading using heavy lines. RU D may also include one or more other portions 1152 that may be empty. Reclaim unit RU D may be referenced by a reclaim unit handle which, in this example, may be referred to as RUH 1 as shown by the solid arrow 1160.

Another reclaim unit 1114-2 identified as RU D'_23 may include one or more portions in which valid user data 1144-1, 1144-2, . . . , (which may be referred to collectively and/or individually as 1144) may be stored as shown with diagonal shading using heavy lines. RU D'_23 may include one or more other portions in which deallocated user data 1148-1, 1148-2, . . . , (which may be referred to collectively and/or individually as 1148) may be stored as shown with diagonal shading using relatively thinner lines. RU D'_23 may be a previously referenced reclaim unit that may be currently associated with (e.g., previously referenced by) the reclaim unit handle which RUH 1 as shown by the dashed arrow 1162.

Another reclaim unit 1114-3 identified as RU D'_104 may include one or more portions in which valid user data 1145-1, 1145-2, . . . , (which may be referred to collectively and/or individually as 1145) may be stored as shown with diagonal shading using heavy lines. RU D'_104 may include one or more other portions in which deallocated user data 1149-1, 1149-2, . . . . (which may be referred to collectively and/or individually as 1149) may be stored as shown with diagonal shading using relatively thinner lines. RU D'_104 may be a previously referenced reclaim unit that may be currently associated with (e.g., previously referenced by) the reclaim unit handle which RUH 1 as shown by the dashed arrow 1164.

Referring to FIG. 11B, based on an update operation that may modify the reclaim unit handle RUH 1 that may reference, or be associated with, RU D, some or all of valid user data 1144 and/or 1145 may be transferred to RU D. Some or all of the data may be transferred before, after and/or as part of, the update operation. Some or all of the data may be transferred before, after, and/or while, the reclaim unit handle RUH 1 is modified to reference a different reclaim unit (e.g., a reclaim unit other than RU D).

In the embodiment illustrated in FIG. 11B, the valid user data 1144 and/or 1145 may fill the one or more empty portions 1152 of RU D. Depending on the implementation details. RU D may be closed (e.g., one or more erase blocks within RU D may be closed). Additionally, or alternatively, depending on the implementation details, one or both of the reclaim units RU D'_23 and/or RU D'_104 may then be reclaimed (e.g., erased, reused, repurposed, and/or the like). Depending on the implementation details, this may reduce write amplification.

Depending on the implementation details, the data transfer operation illustrated in FIG. 11A and FIG. 11B may be characterized as implementing persistent isolation because, for example, the valid user data 1144 and/or 1145 transferred to RU D may only be read from reclaim units that are associated with (e.g., previously referenced by) the reclaim unit handle RUH 1 (e.g., the valid user data 1144 and/or 1145 may only be read from reclaim units (e.g., RU D'_23 and/or RU D'_104) that were referenced by RUH 1 when they were written with the valid user data that is transferred to RU D).

In the embodiment illustrated in FIG. 11, the valid user data 1144 and/or 1145 may fill the one or more empty portions 1152 of RU D, and thus, the reclaim unit 114-1 RU D may be full. In other embodiments, however, the valid user data 1144 and/or 1145 may be more or less than the amount required to fill the one or more empty portions 1152 of RU D. If the valid user data 1144 and/or 145 is greater than the capacity of the one or more empty portions 1152 of RU D, only the amount of valid user data 1144 and/or 1145 needed to fill the one or more empty portions 1152 of RU D may be transferred, and any remaining portion of the valid user data 1144 and/or 1145 may be left in place in RU D'_23 and/or RU D'_104, or transferred to another reclaim unit (e.g., as part of a garbage collection operation).

If the amount of valid user data 1144 and/or 1145 is less than the capacity of the one or more empty portions 1152 of RU D, some or all of the remaining empty portions 1152 of RU D may be filled with valid user data transferred from one or more other reclaim units (e.g., a fourth reclaim unit that may be referred to, for example, as RU D'_45). Alternatively, or additionally, some or all of the remaining empty portions 1152 of RU D may be filled with fill data such as zeros, random data, and/or metadata. Moreover, in some embodiments, data transfers between reclaim units may be limited to reclaim units in the same reclaim group.

Figure 12A:
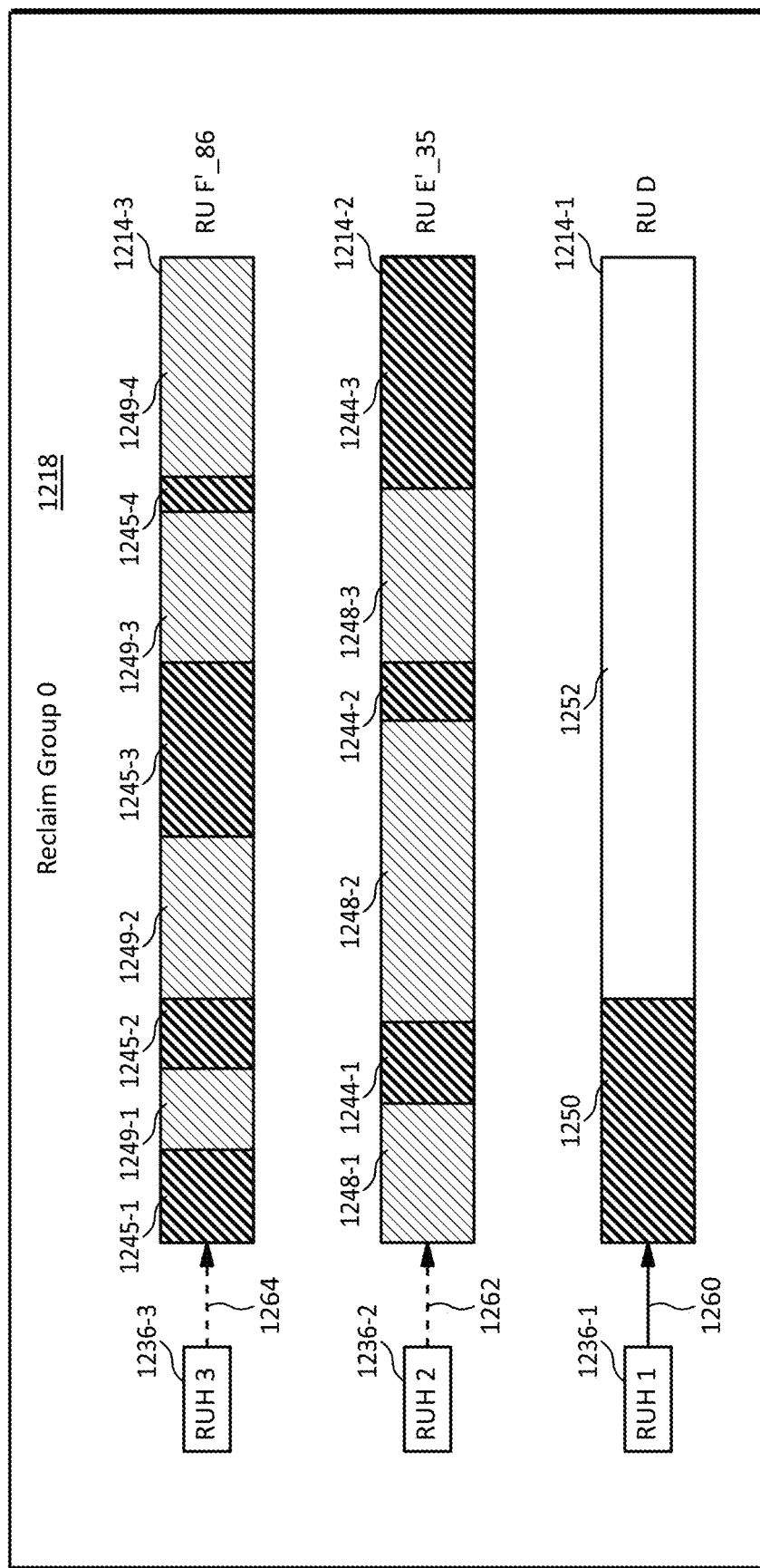
FIG. 12A illustrates a second embodiment of a data transfer operation in a first state for a flexible data placement scheme in accordance with example embodiments of the disclosure.
Figure 12B:
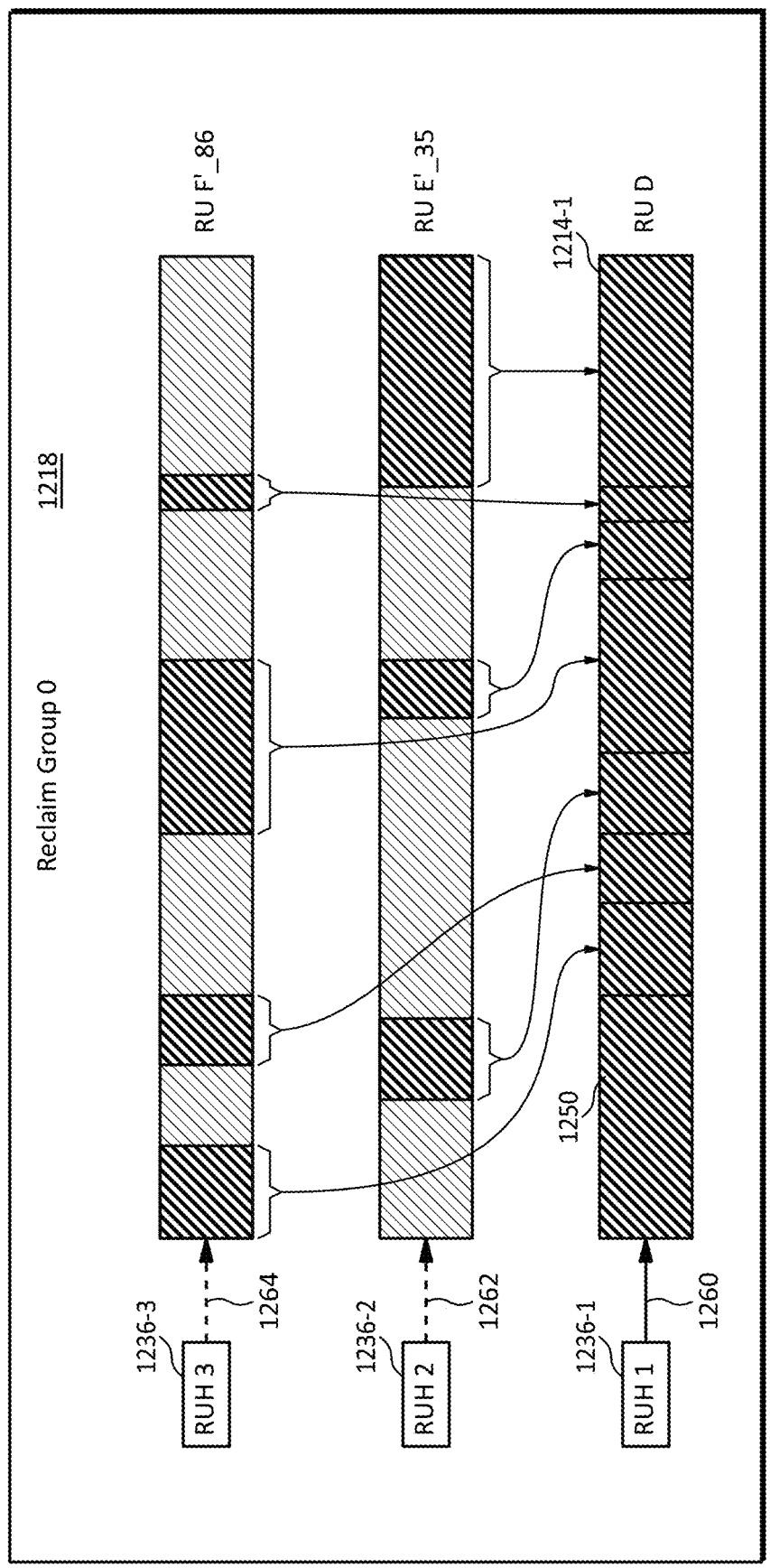
FIG. 12B illustrates the embodiment of the data transfer operation illustrated in FIG. 12A in a second state in accordance with example embodiments of the disclosure.

FIG. 12A illustrates a second embodiment of a data transfer operation in a first state for a flexible data placement scheme in accordance with example embodiments of the disclosure. FIG. 12B illustrates the embodiment of the data transfer operation illustrated in FIG. 12A in a second state in accordance with example embodiments of the disclosure. The embodiment illustrated in FIG. 12A and FIG. 12B may be used, for example, with any of the update operations disclosed herein, including those described with respect to FIG. 8, FIG. 9, and/or FIG. 10.

Referring to FIG. 12A, a reclaim unit 1214-1 identified as RU D may include a first portion in which user data 1250 may be stored as shown with diagonal shading using heavy lines. RU D may also include one or more other portions 1252 that may be empty. Reclaim unit RU D may be referenced by a first reclaim unit handle which, in this example, may be referred to as RUH 1 as shown by the solid arrow 1260.

Another reclaim unit 1214-2 identified as RU E'_35 may include one or more portions in which valid user data 1244-1, 1244-2, . . . , (which may be referred to collectively and/or individually as 1244) may be stored as shown with diagonal shading using heavy lines. RU E'_35 may include one or more other portions in which deallocated user data 1248-1, 1248-2 . . . , (which may be referred to collectively and/or individually as 1248) may be stored as shown with diagonal shading using relatively thinner lines. RU E'_35 may be a previously referenced reclaim unit that may be currently associated with (e.g., previously referenced by) a second reclaim unit handle which may be referred to as RUH 2 as shown by the dashed arrow 1262.

Another reclaim unit 1214-3 identified as RU F'_86 may include one or more portions in which valid user data 1245-1, 1245-2, . . . , (which may be referred to collectively and/or individually as 1245) may be stored as shown with diagonal shading using heavy lines. RU F'_86 may include one or more other portions in which deallocated user data 1249-1, 1249-2, . . . , (which may be referred to collectively and/or individually as 1249) may be stored as shown with diagonal shading using relatively thinner lines. RU F'_86 may be a previously referenced reclaim unit that may be currently associated with (e.g., previously referenced by) a third reclaim unit handle which may be referred to as RUH 3 as shown by the dashed arrow 1264.

Referring to FIG. 12B, based on an update operation that may modify the reclaim unit handle RUH 1 that may reference, or be associated with, RU D, some or all of valid user data 1244 and/or 1245 may be transferred to RU D. Some or all of the data may be transferred before, after and/or as part of, the update operation. Some or all of the data may be transferred before, after, and/or while, the reclaim unit handle RUH 1 is modified to reference a different reclaim unit (e.g., a reclaim unit other than RU D).

In the embodiment illustrated in FIG. 12B, the valid user data 1244 and/or 1245 may fill the one or more empty portions 1252 of RU D. Depending on the implementation details. RU D may be closed (e.g., one or more erase blocks within RU D may be closed). Additionally, or alternatively, depending on the implementation details, one or both of the reclaim units RU E'_35 and/or RU F'_86 may then be reclaimed (e.g., erased, reused, repurposed, and/or the like). Depending on the implementation details, this may reduce write amplification.

Depending on the implementation details, the data transfer operation illustrated in FIG. 12A and FIG. 12B may be characterized as implementing initial isolation because, for example, the valid user data 1244 and/or 1245 transferred to RU D may be read from reclaim units that are currently referenced by and/or associated with (e.g., previously referenced by) one or more reclaim unit handles other than reclaim unit handle RUH 1 (e.g., the valid user data 1244 and/or 1245 may be read from reclaim units (e.g., RU E'_35 and/or RU F'_86) that were referenced by reclaim unit handles other than RUH 1 when they were written with the valid user data that is transferred to RU D).

In the embodiment illustrated in FIG. 12, the valid user data 1244 and/or 1245 may fill the one or more empty portions 1252 of RU D, and thus, the reclaim unit 124-1 RU D may be full. In other embodiments, however, the valid user data 1244 and/or 1245 may be more or less than the amount required to fill the one or more empty portions 1252 of RU D. If the valid user data 1244 and/or 1245 is greater than the capacity of the one or more empty portions 1252 of RU D, only the amount of valid user data 1244 and/or 1245 needed to fill the one or more empty portions 1252 of RU D may be transferred, and any remaining portion of the valid user data 1244 and/or 1245 may be left in place in RU E'_35 and/or RU F'_86, or transferred to another reclaim unit (e.g., as part of a garbage collection operation).

If the amount of valid user data 1244 and/or 1245 is less than the capacity of the one or more empty portions 1252 of RU D, some or all of the remaining empty portions 1252 of RU D may be filled with valid user data transferred from one or more other reclaim units (e.g., a fourth reclaim unit that may be referred to, for example, as RU G'_55). Alternatively, or additionally, some or all of the remaining empty portions 1252 of RU D may be filled with fill data such as zeros, random data, and/or metadata. Moreover, in some embodiments, data transfers between reclaim units may be limited to reclaim units in the same reclaim group.

In the embodiments described with respect to FIG. 8. FIG. 9. FIG. 10, and/or FIG. 11, data may be transferred to a reclaim unit that may be the subject of an update operation. In some other embodiments, however, data may be transferred from a reclaim unit that may be the subject of an update operation.

Figure 13A:
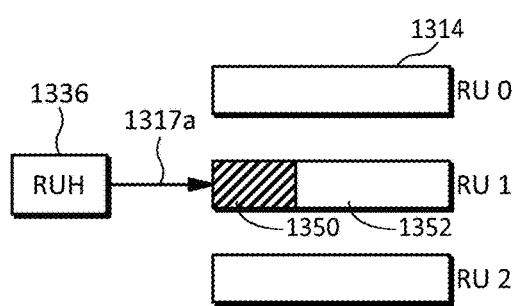
FIG. 13A illustrates an embodiment of a flexible data placement scheme with data transfer from a reclaim unit in a storage device in a first state in accordance with example embodiments of the disclosure.
Figure 13B:
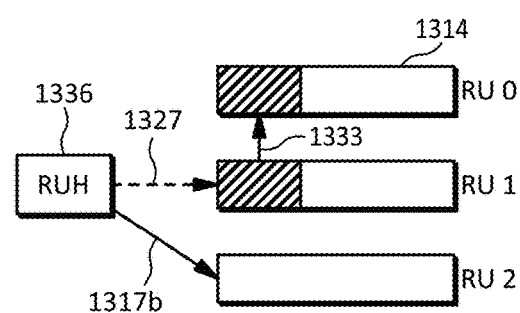
FIG. 13B illustrates the embodiment illustrated in FIG. 13A in a second state in accordance with example embodiments of the disclosure.

FIG. 13A illustrates an embodiment of a flexible data placement scheme with data transfer from a reclaim unit in a storage device in a first state in accordance with example embodiments of the disclosure. FIG. 13B illustrates the embodiment illustrated in FIG. 13A in a second state in accordance with example embodiments of the disclosure. FIG. 13A and FIG. 13B may be referred to collectively and/or individually as FIG. 13.

The embodiment illustrated in FIG. 13 may include at least three reclaim units 1314 identified as RU 0, RU 1, and/or RU 2, and a reclaim unit handle (RUH) 1336.

FIG. 13A illustrates a first state in which RU 0 may have writable space available to transfer data into, RU 1 may currently be referenced by reclaim unit handle 1336 as shown by arrow 1317*a*, and RU 2 may be empty. Examples of RU 0 that may have writable space available may include an empty reclaim unit, a reclaim unit that is currently referenced by a reclaim unit handle but has empty space, a previously referenced reclaim unit that still has empty space, and/or the like.

RU 1 may include at least a first portion storing valid user data 1350 as shown with diagonal shading using heavy lines. RU 1 may include one or more other portions 1352 that may be empty (e.g., have been erased and not yet programmed with user data).

FIG. 13B illustrates a second state after an update operation which may be performed, for example, by a controller in which the reclaim units 1314 and reclaim unit handle 1336 may be located. The update operation may modify the reclaim unit handle 1336 to reference the empty reclaim unit RU 2 as shown by arrow 1317*b*. Although no longer referenced by the reclaim unit handle 1336, RU 1 may remain associated with the reclaim unit handle 1336 as shown by dashed arrow 1327.

Based on the update operation, at least a portion of the valid user data 1350 in RU 1 may be read from RU 1 and written to an empty portion of RU 0 (e.g., copied or moved from RU 1 to RU 0) as shown by arrow 1333.

Depending on the implementation details, this transfer of data between reclaim units may have one or more effects. For example, moving valid user data from RU 1 to RU 0 may enable RU 1 to be reclaimed (e.g., erased, reused, repurposed, returned to a pool of available (e.g., empty, erased, and/or the like) memory for later reuse, and/or the like). Depending on the implementation details, this may reduce write amplification. Moreover, depending on the implementation details of the type of storage media used for RU 1 (e.g., depending on NAND characterization data for storage media implemented with NAND flash memory), it may be beneficial to erase RU 1 as one or more open erase blocks (compared, for example, to erasing one or more filled and/or closed erase blocks). Additionally, or alternatively, if RU 1 is updated based on an update request that includes multiple reclaim unit handles, and if more than one of the reclaim unit handles is implemented with initial isolation, then data from multiple reclaim units (e.g., such as RU 1) that are implemented with initial isolation may be copied to the same reclaim unit (such as RU 0), for example, concurrently and/or based on the same update operation and/or update operation request.

Alternatively, or additionally, a flexible data placement scheme in accordance with example embodiments of the disclosure may store data in one or more overprovisioning spaces associated with one or more reclaim units. For example, if a reclaim unit handle references a reclaim unit having an associated overprovisioning space, and the referenced reclaim unit is only partially full when an update operation is requested, rather than modifying the reclaim unit handle to reference a different (e.g., empty) reclaim unit, the reclaim unit handle may be left unmodified, and at least a portion of the overprovisioning space may be used to store user data written to the reclaim unit in response to one or more write commands that may specify the reclaim unit handle. In some embodiments, this may be characterized as modifying, based on an update request, the reclaim unit rather than, or in addition to, the reclaim unit handle.

Figure 14:
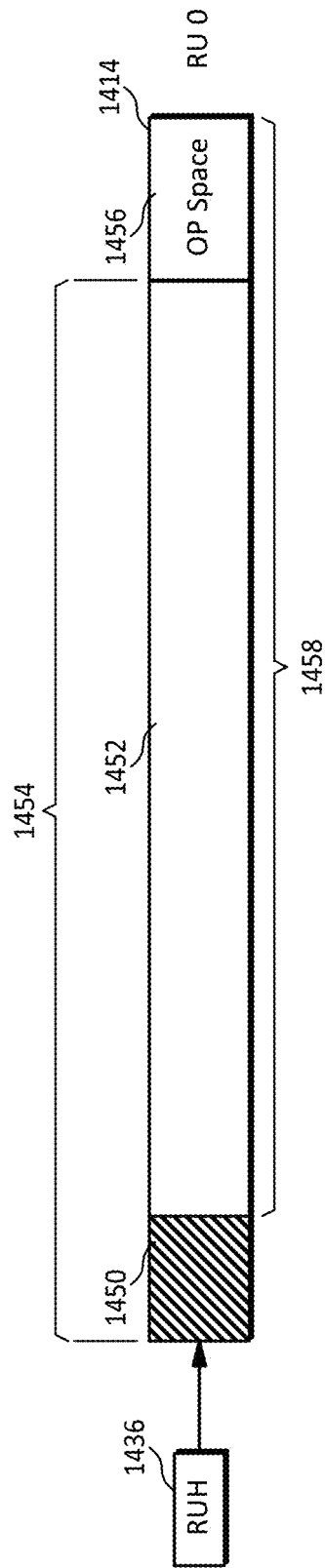
FIG. 14 illustrates an example embodiment of a flexible data placement scheme with data storage in overprovisioning space in accordance with example embodiments of the disclosure.

FIG. 14 illustrates an example embodiment of a flexible data placement scheme with data storage in overprovisioning space in accordance with example embodiments of the disclosure. The embodiment illustrated in FIG. 14 may include a reclaim unit handle (RUH) 1436 that may reference a reclaim unit (RU 0) 1414. The reclaim unit 1414 may include an amount of data storage space 1454 that may be known to a host (e.g., a reclaim unit size that may be configured by a host, a storage device, and/or the like). In some embodiments, this may be referred to as an original or initial storage space for the reclaim unit 1414.

An overprovisioning (OP) space 1456 may be associated with the reclaim unit 1414. Some storage devices may include overprovisioning space for purposes such as storing controller metadata, adapting to storage media behavior (e.g., a word line failure), operating a secondary data protection scheme (e.g., a redundant array of independent drives (RAID)), and/or the like. For example, in some storage devices, an erase block may include one or more spare word lines of storage that may not be known to a host. Alternatively, or additionally, overprovisioning space associated with an erase block and/or a reclaim unit may be in separate physical storage (e.g., a separate erase block that may be mapped to the erase block of a reclaim unit and arranged to be erased, reused, repurposed, returned to a pool of available (e.g., empty, erased, and/or the like) memory for later reuse, and/or the like along with the reclaim unit). In some embodiments, some or all of the overprovisioning space 1456 may be implemented with one or more types of storage media that may be different from the original data storage space 1454.

A spare word line may be used, for example, to replace a failed word line in a manner that is not visible to a host. Thus, in some embodiments, if the reclaim unit 1414 is implemented, for example, with two erase blocks, and each erase block includes a spare word line, the reclaim unit 1414 may include two spare word lines of storage that a host may not be aware of.

As illustrated in FIG. 14, the original data storage space 1454 may include one or more first portions 1450 in which user data may be stored as shown by diagonal shading, and one or more empty portions 1452. Thus, the original data storage space 1454 may only be partially full. If an update operation is requested for the reclaim unit handle 1436 (e.g., by an update request sent from a host to a controller of a storage device in which one or both of the reclaim unit handle 1436 and reclaim unit 1414 may be located), rather than modifying the reclaim unit handle 1436 to reference a different reclaim unit, a controller may modify the storage space used to store user data in the reclaim unit 1414. For example, the user data in the one or more first portions 1450 of the reclaim unit 1414 may be left in place, and a modified data storage space 1458, which may include at least a portion of overprovisioning space 1456, may be used to store user data based on one or more write commands. Depending on the implementation details, the modified data storage space 1458 may be at least the same size as the original data storage space 1454, and thus, a host may store the same amount of data it expects to store in a normal reclaim unit referenced by the reclaim unit handle 1436.

Although not limited to any specific implementation details, a flexible data placement scheme with data storage in overprovisioning space in accordance with example embodiments of the disclosure (such as that illustrated in FIG. 14) may be especially beneficial, for example, if, at the time an update operation is performed, the amount of user data stored in the one or more first portions 1450 of the reclaim unit 1414 is less than or equal to the amount of overprovisioning space 1456.

Additionally, or alternatively, storing user data in overprovisioning space associated with a reclaim unit may be beneficial, for example, if an update request is received early during the filling of the reclaim unit 1414 (e.g., at a time when the amount of user data stored in the one or more first portions 1450 is relatively small, and/or an amount of time remaining on an open block timer associated with the reclaim unit is relatively large (e.g., if the reclaim unit 1414 was recently opened. In some embodiments, when using some or all of the overprovisioning space 1456 as part of the modified data storage space 1458, the reclaim unit 1414 may be expected to remain open for approximately an estimated active reclaim unit time remaining.

Additionally. or alternatively, storing user data in overprovisioning space associated with a reclaim unit may be beneficial, for example, if the storage media with which the reclaim unit 1414 is implemented is relatively new and/or has been subjected to relatively few program and/or erase (P/E) cycles (e.g., because the likelihood of using the overprovisioning space 1456 to replace failed storage media may be relatively low).

Additionally, or alternatively, storing user data in an overprovisioning space 1454 associated with a reclaim unit 1414 may be extended to one or more additional overprovisioning spaces in one or more additional reclaim units. For example, if, at the time an update operation is performed, the amount of user data stored in the one or more first portions 1450 of the reclaim unit 1414 is greater than an amount of overprovisioning space 1456, the modified data storage space 1458 may be extended to include one or more additional overprovisioning spaces in one or more additional reclaim units. This may be implemented, for example, by using a data buffer to store (e.g., temporarily) an amount of data that exceeds the amount of overprovisioning space 1456. For example, if an overprovisioning space 1454 associated with a reclaim unit 1414 includes two word lines of user data, and the one or more first portions 1450 of the reclaim unit 1414 includes three word lines of user data, two of the word lines of user data may be stored in the first overprovisioning space 1454 associated with the reclaim unit 1414, and the third word line of user data may be stored, for example, until it may be stored in an overprovisioning space associated with one or more next reclaim units opened and/or referenced by the reclaim unit handle 1436.

In some embodiments, when a reclaim unit such as reclaim unit 1414 is closed (e.g., when it is filled with user data) an overprovisioning space 1456 associated with a reclaim unit 1414 may be filled with fill data (e.g., to properly close the reclaim unit 1414 and/or one or more erase blocks with which it may be implemented). In some embodiments in accordance with the disclosure, rather than filling overprovisioning space 1456 associated with a reclaim unit 1414 with fill data, some or all of the overprovisioning space 1456 may be filled with valid user data, for example, from a previously referenced reclaim unit.

In some embodiments, storing user data in overprovisioning space associated with a reclaim unit, an open time for a reclaim unit (e.g., an estimated open time), and/or the like, may be characterized as consuming margin of the overprovisioning space, the reclaim unit, the open time, and/or the like.

Any of the storage devices, storage media, and/or the like, disclosed herein may be implemented with any type of nonvolatile storage media based on solid state media, magnetic media, optical media, and/or the like. For example, in some embodiments, a computational storage device may be implemented as an SSD based on not-AND (NAND) flash memory, persistent memory such as cross-gridded nonvolatile memory, memory with bulk resistance change, phase change memory (PCM), and/or the like, or any combination thereof.

Any of the storage devices disclosed herein may be implemented in any form factor such as 3.5 inch, 2.5 inch, 1.8 inch, M.2, Enterprise and Data Center SSD Form Factor (EDSFF). NFL, and/or the like, using any connector configuration such as Serial ATA (SATA). Small Computer System Interface (SCSI), Serial Attached SCSI (SAS), U.2, and/or the like.

Any of the storage devices disclosed herein may be implemented entirely or partially with, and/or used in connection with, a server chassis, server rack, dataroom, datacenter, edge datacenter, mobile edge datacenter, and/or any combinations thereof.

Any of the hosts disclosed herein may be implemented with any component or combination of components such as a compute server, a storage server, a network server, a cloud server, and/or the like, a node such as a storage node, a computer such as a workstation, a personal computer, a tablet, a smartphone, and/or the like, or multiples and/or combinations thereof.

Any of the communication connections and/or communication interfaces disclosed herein may be implemented with one or more interconnects, one or more networks, a network of networks (e.g., the internet), and/or the like, or a combination thereof, using any type of interface and/or protocol. Examples may include Peripheral Component Interconnect Express (PCIe). NVMe, NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, Serial ATA (SATA), Small Computer Systems Interface (SCSI). Serial Attached SCSI (SAS), iWARP, Compute Express Link (CXL), and/or a coherent protocol such as CXL.mem, CXL.cache, CXL.IO and/or the like, Gen-Z. Open Coherent Accelerator Processor Interface (OpenCAPI), Cache Coherent Interconnect for Accelerators (CCIX), and/or the like. Advanced eXtensible Interface (AXI), any generation of wireless network including 2G, 3G, 4G, 5G, 6G, and/or the like, any generation of Wi-Fi, Bluetooth, near-field communication (NFC), and/or the like, or any combination thereof.

Any of the functionality described herein, including any of the host functionality, storage device functionally, and/or the like (e.g., any of the storage device controllers, logic, and/or the like) may be implemented with hardware, software, firmware, or any combination thereof including, for example, hardware and/or software combinational logic, sequential logic, timers, counters, registers, state machines, volatile memories such DRAM and/or SRAM, nonvolatile memory including flash memory, persistent memory such as cross-gridded nonvolatile memory, memory with bulk resistance change, PCM, and/or the like and/or any combination thereof, complex programmable logic devices (CPLDs), field programmable gate arrays (FPGAs), application specific circuits (ASICs), central processing units (CPUs) including CISC processors such as x86 processors and/or RISC processors such as ARM processors, graphics processing units (GPUs), neural processing units (NPUs), tensor processing units (TPUs), and/or the like, executing instructions stored in any type of memory. In some embodiments, one or more components may be implemented as a system-on-chip (SOC).

In embodiments implemented at least partially with a storage device having a flash translation layer (FTL) any of the functionality described herein (e.g., any of the storage device controllers, logic, and/or the like) may be implemented at least partially with an FTL.

In some embodiments, a reclaim unit may include physical non-volatile storage that may be reclaimed (e.g., erased, reused, repurposed, and/or the like) as a unit. Depending on the implementation details, a reclaim unit may be reclaimed without disturbing one or more other reclaim units. In some embodiments, a reclaim unit may be implemented as a physical construct only (e.g., may be unrelated to logical addresses or logical block addresses (LBAs).

In some embodiments, a namespace may include a capacity allocated, for example, in one or more reclaim units. A reclaim group may include one or more reclaim units, and one or more placement handles may reference one or more reclaim units (e.g., that may be targeted by one or more I/O commands). In some embodiments, I/O commands performed on one reclaim group may not interfere with the performance, reliability, and/or the like, of commands executed on another reclaim group.

In some embodiments, a placement identifier may specify a reclaim group paired with a placement handle, a reclaim unit handle, and/or the like. A placement identifier may reference a reclaim unit that may be available, for example, for writing random LBAs (e.g., writing user data to the non-volatile storage allocated to the reclaim unit). The written capacity of a reclaim unit referenced by a placement identifier may be incremented in connection with one or more write commands (e.g., incremented on each write command) specifying that placement identifier, placement handle, reclaim unit handle, and/or the like, which, in turn, may be modified to reference another reclaim unit once the capacity of the reclaim unit is partially or fully written.

In some embodiments, a host may track user data (e.g., one or more LBAs of user data) written to one or more reclaim units. Depending on the implementation details, this may enable a host to deallocate some or all user data (e.g., all LBAs) associated with a particular reclaim unit together (e.g., at the same time). Depending on the implementation details, this may reduce or minimize garbage collection by a controller, thereby reducing write amplification. In some embodiments, a host may be responsible for managing placement identifiers, placement handles, reclaim unit handles, and/or other related device resources.

In some embodiments, a reclaim unit handle may include a reference to a reclaim unit (e.g., in each reclaim group) where user data for a write command may be placed. In some embodiments, a reclaim unit referenced by the reclaim unit handle may only be allowed to be referenced by at most one reclaim unit handle. In some embodiments, however, a specific reclaim unit may be referenced by the same or different reclaim unit handles as the reclaim unit is cycled from erased and back into use. When a reclaim unit is written to capacity, a controller may update an associated reclaim unit handle to reference a different reclaim unit that is available for writing user data (e.g., non-volatile storage media that may have been erased prior to writing) and has been written with little or no user data (e.g., an empty reclaim unit).

Figure 15:
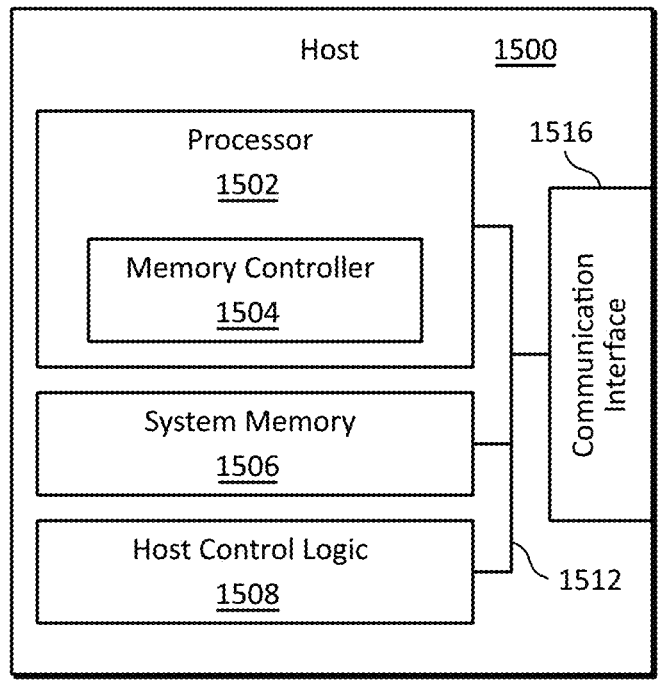
FIG. 15 illustrates an example embodiment of a host apparatus that may be used to implement any of the host functionality disclosed herein in accordance with example embodiments of the disclosure.

FIG. 15 illustrates an example embodiment of a host apparatus that may be used to implement any of the host functionality disclosed herein in accordance with example embodiments of the disclosure. The host apparatus 1500 illustrated in FIG. 15 may include a processor 1502, which may include a memory controller 1504, a system memory 1506, host control logic 1508, and/or a communication interface 1510. Any or all of the components illustrated in FIG. 15 may communicate through one or more system buses 1512. In some embodiments, one or more of the components illustrated in FIG. 15 may be implemented using other components. For example, in some embodiments, the host control logic 1508 may be implemented by the processor 1502 executing instructions stored in the system memory 1506 or other memory.

Figure 16:
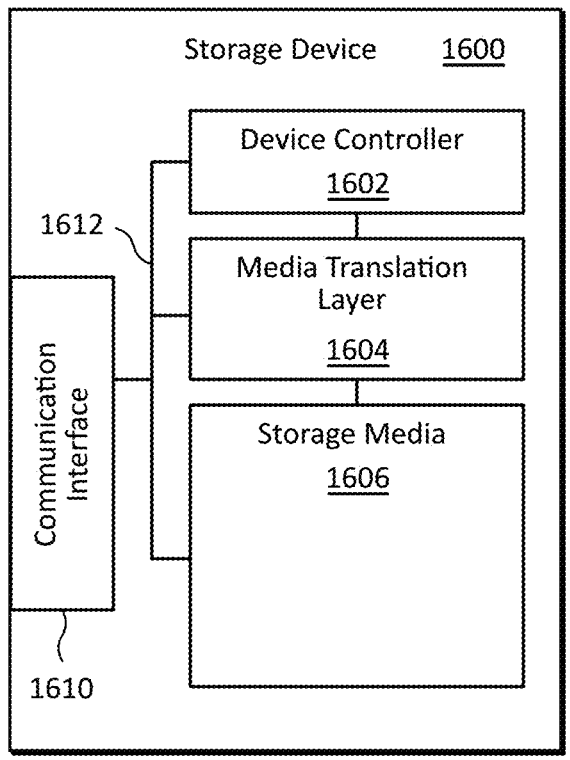
FIG. 16 illustrates an example embodiment of a storage device that may be used to implement any of the storage device functionality disclosed herein in accordance with example embodiments of the disclosure.

FIG. 16 illustrates an example embodiment of a storage device that may be used to implement any of the storage device functionality disclosed herein in accordance with example embodiments of the disclosure. The storage device 1600 may include a device controller 1602, a media translation layer 1604 (e.g., an FTL), and/or storage media 1606. The components illustrated in FIG. 16 may communicate through one or more device buses 1612. In some embodiments that may use flash memory for some or all of the storage media 1606, the media translation layer 1604 may be implemented partially or entirely as a flash translation layer (FTL).

Figure 17:
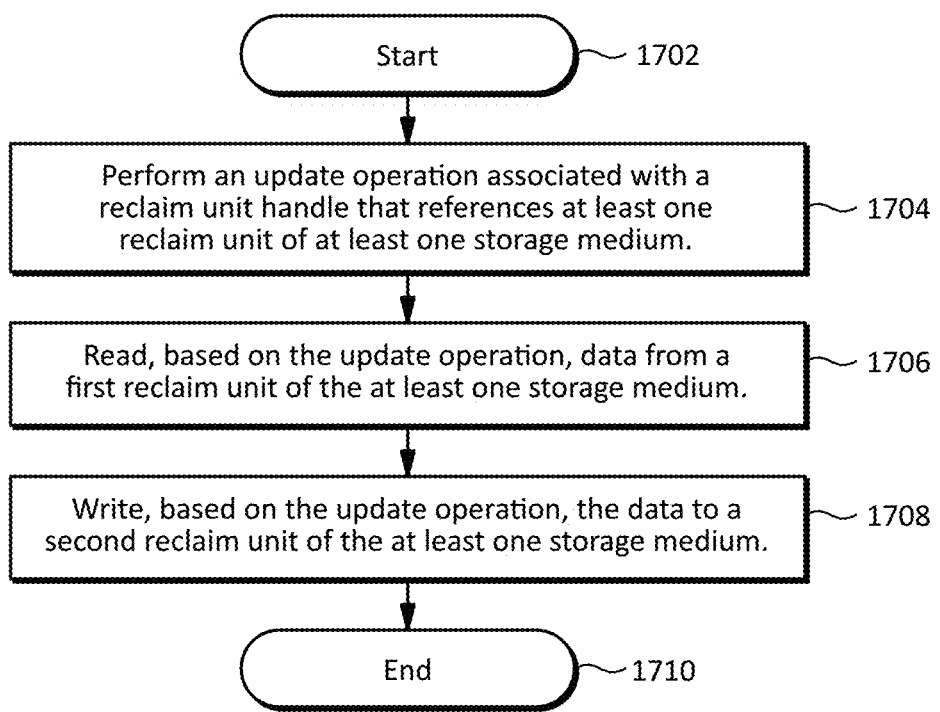
FIG. 17 illustrates an embodiment of a method for flexible data placement for a storage device in accordance with example embodiments of the disclosure.

FIG. 17 illustrates an embodiment of a method for flexible data placement for a storage device in accordance with example embodiments of the disclosure. The method may begin at operation 1702. The method may be performed, for example, by a controller such as controller 726 illustrated in FIG. 7 and/or controller 1602 illustrated in FIG. 16.

At operation 1704, the method may perform an update operation associated with a reclaim unit handle that references at least one reclaim unit of at least one storage medium. For example, referring to FIG. 8B and/or FIG. 13B, a reclaim unit handle RUH may initially reference reclaim unit RU 1 as shown by arrows 827 and/or 1327, respectively. An update operation may include updating RUH to reference reclaim unit RU 2 as shown by arrows 817b and/or 1317b in FIG. 8B and/or FIG. 13B, respectively. As further examples, referring to FIG. 9B and/or FIG. 10B, a reclaim unit handle RUH X may initially reference reclaim unit RU A'_1 and/or RU A'_0, respectively, as shown by arrows 927 and/or 1027, respectively. An update operation may include updating RUH X to reference reclaim unit RU A as shown by arrows 917b and/or 1017b in FIG. 9B and/or FIG. 10B, respectively.

At operation 1706, the method may read, based on the update operation, data from a first reclaim unit of the at least one storage medium, and at operation 1708, the method may write, based on the update operation, the data to a second reclaim unit of the at least one storage medium. For example, referring to FIG. 8A, FIG. 9B, and/or FIG. 10B, data may be read from a first reclaim unit (RU 0, RU A'0, and/or RU B'_0, respectively) and written to a second reclaim unit (RU 1, RU A'_1, and/or RU A'_0, respectively) as illustrated by arrows 829, 929, and/or 1029, respectively. As another example, referring to FIG. 13B, data may be read from a first reclaim unit RU 1 and written to a second reclaim unit RU 0 as illustrated by arrow 1333. The method may end at operation 1710.

The embodiment illustrated in FIG. 17, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. A reference to a component or element may refer to one or more of the component or element, and a reference to plural components or elements may refer to a single component or element. For example, a reference to a resource may refer to one more resources, and a reference to resources may refer to a single resource. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example. "based on" may refer to "based at least in part on." and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

Since the inventive principles of this patent disclosure may be modified in arrangement and detail without departing from the inventive concepts, such changes and modifications are considered to fall within the scope of the following claims.

The invention claimed is:

1. A storage device comprising:
at least one storage medium; and
a controller comprising at least one processor configured to:
read, based on an update operation, data from a first reclaim unit of the at least one storage medium;
write, based on the update operation, the data to a second reclaim unit of the at least one storage medium;
receive a write command that specifies an identifier of a reclaim unit handle; and
write to the second reclaim unit based on the write command that specifies the identifier of the reclaim unit handle.

2. The storage device of claim 1, wherein, based on the update operation, the reclaim unit handle is updated to reference the second reclaim unit.

3. The storage device of claim 2, wherein the first reclaim unit is associated with the reclaim unit handle.

4. The storage device of claim 2, wherein the reclaim unit handle is a first reclaim unit handle, and the first reclaim unit is associated with a second reclaim unit handle.

5. The storage device of claim 2, wherein the at least one processor is configured to perform a reclaim operation on the first reclaim unit based on the update operation.

6. The storage device of claim 2, wherein the at least one processor is configured to fill the second reclaim unit based, at least in part, on the update operation.

7. The storage device of claim 2, wherein the data is first data, and the at least one processor is configured to:
read second data from a third reclaim unit of the at least one storage medium; and
write the second data to the second reclaim unit.

8. The storage device of claim 7, wherein the third reclaim unit is associated with the reclaim unit handle.

9. The storage device of claim 1, wherein, based on the update operation, the first reclaim unit is associated with the reclaim unit handle.

10. The storage device of claim 9, wherein:
the data is first data;
the first data is written to a first portion of the second reclaim unit; and
at least a second portion of the second reclaim unit includes second data associated with the reclaim unit handle.

11. The storage device of claim 9, wherein:
the data is first data;
the first data is written to a first portion of the second reclaim unit;
the reclaim unit handle is a first reclaim unit handle; and
at least a second portion of the second reclaim unit includes second data associated with a second reclaim unit handle.

12. The storage device of claim 9, wherein the at least one processor is configured to perform a reclaim operation on the first reclaim unit based on the update operation.

13. The storage device of claim 1, wherein the update operation comprises modifying the reclaim unit handle.

14. A method comprising:
reading, based on an update operation, data from a first reclaim unit of at least one storage medium; and
writing, based on the update operation, the data to a second reclaim unit of the at least one storage medium;
receiving a write command that specifies an identifier of a reclaim unit handle; and
writing to the second reclaim unit based on the write command that specifies the identifier of the reclaim unit handle.

15. The method of claim 14, wherein, based on the update operation, the reclaim unit handle is updated to reference the second reclaim unit.

16. The method of claim 15, wherein the first reclaim unit is associated with the reclaim unit handle.

17. The method of claim 15, wherein the reclaim unit handle is a first reclaim unit handle, and the first reclaim unit is associated with a second reclaim unit handle.

18. The method of claim 14, wherein, based on the update operation, the first reclaim unit is associated with the reclaim unit handle.

19. The method of claim 14, wherein the update operation comprises modifying the reclaim unit handle.

20. A storage device comprising:
at least one storage medium; and
a controller comprising at least one processor configured to perform an update operation associated with a reclaim unit of the at least one storage medium;
wherein a first portion of the reclaim unit includes data, and the update operation comprises referencing, by a reclaim unit handle, a second portion of the reclaim unit and at least a portion of an overprovisioning space associated with the reclaim unit;
the at least one processor of the controller being configured to:
receive a write command that specifies an identifier of the reclaim unit handle; and
write to the reclaim unit based on the write command that specifies the identifier of the reclaim unit handle.

* * * * *